(12) United States Patent
Mehnert et al.

(10) Patent No.: US 10,330,501 B2
(45) Date of Patent: *Jun. 25, 2019

(54) COUNTING SENSOR HAVING A CORRECTION FUNCTION

(71) Applicant: Avago Technologies International Sales Pte. Limited, Singapore (SG)

(72) Inventors: Walter Mehnert, Ottobrunn (DE); Thomas Theil, Feldafing (DE)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/609,439

(22) Filed: May 31, 2017

(65) Prior Publication Data

US 2017/0343387 A1    Nov. 30, 2017

(30) Foreign Application Priority Data

May 31, 2016 (DE) .......................... 10 2016 209 480
Mar. 7, 2017 (DE) .......................... 10 2017 203 683

(51) Int. Cl.
*G01D 5/244* (2006.01)
*G01D 5/245* (2006.01)
(Continued)

(52) U.S. Cl.
CPC ......... *G01D 5/24476* (2013.01); *G01D 5/145* (2013.01); *G01D 5/245* (2013.01); *G01P 3/4815* (2013.01)

(58) Field of Classification Search
CPC ............................................. G01D 5/12–2525
See application file for complete search history.

(56) References Cited

U.S. PATENT DOCUMENTS 6,084,400 A * 7/2000 Steinich ................ G01P 3/4815
                                                  324/207.13
7,113,063 B2 * 9/2006 Romanik ........... H01H 36/0033
                                                  335/205
(Continued)

FOREIGN PATENT DOCUMENTS

DE          10259223          2/2004

*Primary Examiner* — Huy Q Phan
*Assistant Examiner* — David B Frederiksen
(74) *Attorney, Agent, or Firm* — Sheridan Ross P.C.

(57) ABSTRACT

The invention relates to a counting sensor for counting the number of rotations or of linear displacements of an object, wherein the counting sensor comprises:
 one single Wiegand module;
 at least one sensor element;
 a processing electronic circuit, which is connected to the sensor element; and
 a permanent magnet arrangement, which is movable relatively to the Wiegand module; wherein
 the processing electronic circuit is configured to obtain direction information, whether the permanent magnet arrangement moves in said one direction or in an opposite direction, and (ii) to obtain magnetic pole information; and
 a data storage for storing a value, which indicates the number of the rotations or of the linear displacements; wherein:
 the processing electronic circuit is configured (i) to determine, on the basis of the direction information and the magnetic pole information, the number of the rotations or of the linear displacements of the object and to store the corresponding value in the data storage, (ii) to perform, on the basis of a sequence of the direction informations and of the magnetic pole informations, an error detection to the effect whether one of the rotations or one of the linear displacements of the object has not (Continued)

been recognized partially or completely, and (iii) to determine an according correction and to correct the value upon detection of an error.

15 Claims, 7 Drawing Sheets

(51) Int. Cl.
    *G01P 3/481*     (2006.01)
    *G01D 5/14*     (2006.01)

(56) References Cited

U.S. PATENT DOCUMENTS

| | | | |
|---|---|---|---|
| 7,598,733 | B2 | 10/2009 | Mehnert et al. |
| 8,766,625 | B2 * | 7/2014 | Mehnert ............... G01D 5/145 |
| | | | 324/207.15 |
| 2002/0105319 | A1 * | 8/2002 | Delaporte ........... G01D 5/24476 |
| | | | 324/207.13 |
| 2002/0193144 | A1 * | 12/2002 | Belski .................... G01D 4/004 |
| | | | 455/557 |
| 2011/0184691 | A1 * | 7/2011 | Mehnert ............... G01D 5/145 |
| | | | 702/151 |
| 2012/0217956 | A1 * | 8/2012 | Parakka .................. G01B 7/30 |
| | | | 324/207.25 |
| 2015/0130450 | A1 * | 5/2015 | Gehringer ............ G01D 5/145 |
| | | | 324/207.25 |
| 2015/0292924 | A1 * | 10/2015 | Shiraishi ............. G01F 25/0007 |
| | | | 73/861.11 |
| 2015/0354986 | A1 * | 12/2015 | Mehnert ............... G01D 5/145 |
| | | | 324/207.16 |

* cited by examiner

COUNTING SENSOR HAVING A CORRECTION FUNCTION

CROSS-REFERENCE TO RELATED APPLICATIONS

This application claims the benefit of the filing dates of the German patent application no. DE 10 2016 209 480.7 filed May 31, 2016, and of the German patent application no. DE 10 2017 203 683.4 filed Mar. 7, 2017, the disclosures of which are hereby incorporated herein by reference.

FIELD OF THE INVENTION

The invention relates to a counting sensor, which determines a number of rotations or of linear displacements of an object.

TECHNOLOGICAL BACKGROUND

In the state of the art, a counting sensor, which has a Wiegand module, is known from the patent document DE 102 59 223 B3.

In this counting sensor, a permanent magnet moves relatively to the Wiegand module, which provides voltage impulses as a function of the movement frequency in corresponding time periods.

A processing electronic circuit detects the voltage impulse, and determines on the basis of the output signal of an additional sensor element and on the basis of the polarity of the voltage impulse both the movement direction of the permanent magnet and also the position of the north pole and of the south pole of the permanent magnet. On the basis of these informations, the processing electronic circuit determines a number of rotations of the permanent magnet and stores the corresponding value in a data storage.

The known counting sensor can be operated in an autonomous mode, in which no external energy supply is available. In the autonomous mode, the processing electronic circuit is supplied with energy, which is provided by the Wiegand module due to the output of the voltage impulses. The energy, which is supplied by the Wiegand module, is sufficient for the determination of the value of the number of rotations, and for the storage process of the value in the data storage, provided that clean voltage impulses are output.

In the framework of the development activities to the present invention, it has been recognized that during the operation of the known counting sensor due to particular courses of movement, which comprise a change of direction of the movement direction of the permanent magnet, the case may occur that the Wiegand module outputs rudimentary voltage impulses (runts due to direction), which are in fact recognized, which though do not provide sufficient energy in order to be able to perform the process of storing the value in the data storage.

In addition to that, it has also been recognized that the case may occur, that the Wiegand module outputs rudimentary voltage impulses in the case of an unchanged movement direction of the permanent magnet arrangement, which pulses are in fact again recognized, which though do not provide sufficient energy in order to be able to perform the process of storing the value. These rudimentary impulses result from the quality of the Wiegand wire (runts due to quality).

In this respect, there may result errors of the stored value and an inaccuracy of the counting sensor.

Furthermore, it is difficult to perform a correction, because the cases of rudimentary voltage impulses must be distinguished.

SUMMARY OF THE INVENTION

In front of this background, there may be a need to provide an accurate counting sensor, which preferably also has a high reliability.

According to an embodiment example of the present invention, there is provided a counting sensor according to the patent claim 1.

According to an aspect of the present invention, a counting sensor according to the invention, which may be for counting the number of rotations or linear displacements of an object, may comprise the following: (i) one single Wiegand module, which may be composed of a Wiegand wire having a coil that surrounds the Wiegand wire, (ii) at least one sensor element, (iii) a processing electronic circuit, which may be connected to the sensor element, and which may be configured to evaluate an output signal that may be output from the sensor element, and (iv) a permanent magnet arrangement, which may be movable relatively to the Wiegand module in one direction as well as in a direction that may be opposite to said one direction, wherein:

the permanent magnet arrangement may be configured to be arranged at/fixed to the object such that the permanent magnet arrangement effects the rotations or the linear displacements together with the object, upon movement of the permanent magnet arrangement in said one direction, the coil of the Wiegand module may generate a voltage impulse, if a north pole or a south pole of the permanent magnet arrangement is located at a first position, and, upon movement of the permanent magnet arrangement in said opposite direction, the coil of the Wiegand module may produce the voltage impulse, if the north pole or the south pole of the permanent magnet arrangement is located at a second position, which may be different from the first position.

In the case that linear movements/displacements are to be detected by the counting sensor, the permanent magnet arrangement may contain at least two magnets and/or four magnetic poles—generally stated 2n magnets (with n=1, 2, 3, . . . , m)—, whereas in the case that rotational movements are to be detected by the counting sensor, the permanent magnet arrangement may get away with only one single magnet. However, also in the case that rotational movements are to be detected, the permanent magnet arrangement may have plural magnets—again generally stated 2n magnets (with n=1, 2, 3, . . . , m).

Due to the relative movement of the permanent magnet arrangement with respect to the Wiegand module, there may result a change of the magnetic field of the permanent magnet arrangement, which may be sensed by the Wiegand module. The Wiegand wire, which may preferably be manufactured from Vicalloy, may be formed in particular/preferably from a soft-magnetic core with a hard-magnetic shell. It is believed that this implementation leads to a physical characteristics of the Wiegand module and/or of the Wiegand wire to the effect that an abrupt change of the orientation of the Weiß domains/magnetic domains of the Wiegand wire may be effected as from a particular amplitude of the magnetic field (macroscopic Barkhausen effect). It is believed that this change leads in turn to the generation of the voltage impulse in the coil of the Wiegand module. As a function of in which direction the permanent magnet arrangement moves, i.e. in said one direction or in the direction that may be opposite to said one direction, the north pole or the south pole of the permanent magnet arrangement, upon generation of the voltage impulse, may be located at the mentioned first or second position. It is believed that the mentioned voltage impulse may be obtained in particular/preferably then, if—starting from the state, that the core and the shell have the same magnetic orientation—the Weiß domains/magnetic domains of the soft-magnetic core, upon reaching the amplitude of the magnetic field, abruptly change their orientation. If the permanent magnet arrangement moves further in the same direction, due to the further increase of the amplitude, an according change of the Weiß domains/magnetic domains of the hard-magnetic shell may also be effected. The impulse, which may be generated thereby, may be much smaller though, and preferably may not be evaluated.

Stated generally, a Wiegand wire of the counting sensor according to the invention may be understood to be preferably a wire, which may have a hard-magnetic shell and a soft-magnetic core, or preferably a soft-magnetic shell and a hard-magnetic core, and which may preferably be operated bipolarly/symmetrically in the intended use of the counting sensor, i.e. the Weiß domains/magnetic domains of both the shell and also the core may change their orientation due to the change of the amplitude and of the orientation of the magnetic field of the permanent magnet arrangement.

In an autonomous mode, in which the counting sensor may not be supplied with outside energy, the processing electronic circuit may be supplied with energy, which may be provided by the Wiegand module.

Preferably, the energy provided by the Wiegand module may be temporarily stored in at least one capacitor.

The processing electronic circuit may be configured, after the detection of the voltage impulse, which may be output by the Wiegand module (i) to possibly obtain direction information about whether the permanent magnet arrangement moves in said one direction or in said opposite direction by the evaluation of the output signal of the sensor element, and (ii) to possibly obtain magnetic pole information about whether the north pole or the south pole of the permanent magnet arrangement is located at the first or at the second position by the evaluation of the output of the sensor element or by the determination of the polarity of the voltage impulse, which is generated by the coil of the Wiegand module.

Preferably, in the autonomous mode, for the determination of the magnetic pole information, the processing electronic circuit may be configured to recognize the voltage impulse of the Wiegand module and subsequently to evaluate the output signal of the sensor element for the determination, whether the north pole or the south pole of the permanent magnet arrangement is located at the first or at the second position.

Furthermore, the counting sensor may have a data storage for storing a value, which indicates the number of the rotations or of the linear displacements.

Particularly preferably, the counting sensor may comprise a non-volatile data storage, for example an FRAM or an EEPROM, and a volatile data storage. The value, which may indicate the number of the rotations or of the linear displacements, may preferably be stored in the volatile data storage as long as the Wiegand module provides sufficient energy, and may be transferred to the non-volatile data storage only then, when the energy, which may be supplied by the Wiegand module, decreases below a threshold value.

Alternatively, however, the data storage may also be only a non-volatile data storage, for example the mentioned FRAM or the EEPROM.

Furthermore, the counting sensor according to the invention may have a tracking information storage for storing tracking information, which may indicate, whether the north pole or the south pole of the permanent magnet arrangement has come to pass a particular tracking position or not, wherein the north pole or the south pole may be located at the tracking position then, if a magnetic field, which may correspond to the north pole or to the south pole, may be oriented parallel to the Wiegand wire and may take effect (or may act) maximally on the magnetic domains of the Wiegand wire.

According to the invention, the processing electronic circuit may be configured (i) to possibly incorporate both the direction informations and also the magnetic pole informations into a sequence, to possibly determine the number of the rotations or of the linear displacements of the object on the basis of the direction informations and the magnetic pole informations, and to possibly store the corresponding value [of said number] in the data storage, and (ii) to possibly perform, on the basis of said sequence and of the tracking information, an error detection to the effect whether one of the rotations or one of the linear displacements of the object has not been recognized partially or completely, and (iii) to possibly determine a corresponding correction of said number and to possibly correct said value upon detection of an error.

The resolution of the number of the rotations and of the linear displacements may depend on the number of the permanent magnets and/or of the magnetic poles of the permanent magnet arrangement. If the already mentioned parameter n=1, the resolution may be 0.5. Upon increase of the parameter n, the resolution may increase correspondingly. The corrections of the number and of the value may be effected according to the resolution.

Preferably, the processing electronic circuit may be configured to determine the number of the rotations or of the linear displacements as a function of the direction (or direction-dependently). That is, a respective sign may be associated to said one direction and to said opposite direction, such that the direction information received by the processing electronic circuit may be signed (or may carry a sign), and the number of the rotations or of the linear displacements may either be increased or be reduced as a function of the direction, in which the permanent magnet arrangement may move.

Alternatively or in addition, the processing electronic circuit may be configured to determine the amount of the number of the rotations or of the linear displacements independently of the direction (or direction-independently). That is, the direction information received by the processing electronic circuit may not be signed (or may not carry a sign), such that the number of the rotations or of the linear displacements may be increased independently of the direction, in which the permanent magnet arrangement may move.

The temporary sequence, into which the direction informations and the magnetic pole informations may be incorporated, may contain, including the obtained direction informations and magnetic pole informations, in total at least two consecutive direction informations and two consecutive magnetic pole informations.

The temporary sequence may be stored, for example, in a shift register storage, which may work according to the FIFO (First in, First out)-principle. The sequence, which may be stored in the shift register storage, may contain at least two consecutive direction informations and two consecutive magnetic pole informations.

Alternatively, the data storage, in particular the volatile and/or the non-volatile data storage, may comprise reserved storage areas, in which the penultimate direction information and magnetic pole information may be stored. The processing electronic circuit, after the detection of the voltage impulse, may obtain the most current direction and magnetic pole informations, which it may hold in an internal storage, and thereby possibly incorporates into said sequence. The information that may be held in the internal storage and the information that may be held in the reserved storage areas together may form said sequence, on the basis of which the error detection may be performed. After performing the error detection, the informations in the reserved storage areas may be overwritten by those from the internal storage.

If, after the detection of the voltage impulse, the processing electronic circuit determines, for example, that one of the magnetic poles of the permanent magnet arrangement is located at the first position, this may mean that the permanent magnet arrangement may move in said one direction. However, if the processing electronic circuit, after the detection of the voltage impulse, determines that one of the magnetic poles of the permanent magnet arrangement is located at the second position, this may mean that the permanent magnet arrangement may move in the direction that may be opposite to said one direction.

In addition, the processing electronic circuit, after the detection of the voltage impulse, may receive the magnetic pole information about which one of the magnetic poles of the permanent magnet arrangement may be located at the determined first or second position.

The direction information and magnetic pole information thus obtained may be stored. On the whole, the value may be reduced to two bits. The bit value 0 or 1 of one of the bits may indicate the direction information, i.e. whether after the detection of the voltage impulse one of the magnetic poles of the permanent magnet arrangement may be located at the first or at the second position. The bit value 0 or 1 of the second bit may indicate, whether after the detection of the voltage impulse, the north pole or the south pole of the permanent magnet arrangement may be located at the first or at the second position.

On the basis of at least two direction informations and magnetic pole informations, which may be stored in said sequence, the error detection may be performed.

The additional storing of the tracking information may allow, on the one hand, a determination as to whether a rudimentary voltage impulse may have occurred or not between two (non-rudimentary) voltage impulses, which may lead to a determining and storing of the value, which may indicate the number of the rotations/the linear displacements and of the magnetic pole information and the direction information, and, on the other hand,—if one of such [rudimentary voltage impulses] is present—a distinction as to whether a rudimentary voltage impulse due to a change of the movement direction of the permanent magnet arrangement or a rudimentary voltage impulse with constant movement direction of the permanent magnet arrangement may be concerned hereby.

Preferably, if in said sequence consecutive direction information and magnetic pole information are identical, the error detection may provide a result to the effect that an error may be present, and the correction may be determined as a function of the tracking information such that
 a. if the tracking information indicates, that the magnetic pole contained in the magnetic pole information has come to pass the tracking information in time between the receipt of the identical direction and magnetic pole informations, the value in the data storage may be supplemented, and
 b. if the tracking information indicates that the magnetic pole contained in the magnetic pole information has not come to pass the tracking position in time between the receipt of the identical direction and magnetic pole informations, the value in the data storage may not be changed.

The explained correction may concern in particular the case, in which the processing electronic circuit may determine the number of the rotations or of the linear displacements as a function of the direction (or directional-dependently), and the values in the sequence may be identical consecutively.

The tracking information may indicate in particular, whether or not the permanent magnet arrangement has moved in the direction, which may be contained in the direction information, beyond a posture, in which the magnetic field corresponding to the north pole or to the south pole may be oriented parallel to the Wiegand wire and may act maximally on the magnetic domains and/or Weiß domains of the Wiegand wire. Stated differently, the posture may also be described as follows: If the counting sensor detects rotations, and if the permanent magnet arrangement rotates exclusively with respect to the Wiegand wire, and does not change its distance to the Wiegand wire, the stated posture may be described unambiguously by the magnetic field being oriented parallel to the Wiegand wire. On the contrary, if the counting sensor detects linear displacements, and if the permanent magnet arrangement does not rotate with respect to the Wiegand wire but is only displaced linearly, the mentioned posture may be described not only by the parallel orientation of the magnetic field, but also by the north pole and the south pole having the smallest distance to the Wiegand wire and the magnetic field possibly presently acting maximally on the magnetic domains.

If the permanent magnet arrangement assumes this explained position, the north pole or the south pole may be located at the tracking position.

The tracking informations may enable a differentiation between the rudimentary voltage impulses, which may occur in the two different situations that have been explained (runt due to direction (or directional runt), and runt due quality (or quality runt).

Preferably, the tracking storage may be arranged at the tracking position and may be a magnetic-field-sensitive storage, which can be written into by the north pole and by the south pole, which may be erased upon the generation of the (non-rudimentary) voltage impulse, and which may subsequently be written into with the tracking information exclusively by the (temporarily) first [or next in time] pole of the permanent magnet arrangement, which (firstly in time) may come to pass by the tracking storage.

The tracking position, at which the tracking storage may be arranged, may be located on a virtual line, which may run parallel to the Wiegand wire and which may be passed by and/or over-swept by the north pole and/or by the south pole of the permanent magnet arrangement during their [of the poles] movement.

As has been explained already, a rudimentary voltage impulse may occur at certain movement sequences, which may comprise a change of direction of the movement direction of the permanent magnet arrangement. This case may occur in particular, if the north pole or the south pole of the permanent magnet arrangement moves to the first and/or second position, if the generation of the voltage impulse is effected in this posture (or position), and if, starting from its position (first or second position), the corresponding pole moves immediately in the opposite direction; thus, if a change of the direction, in which the permanent magnet arrangement moves, is effected immediately. At the other position, which may correspond to the opposite direction (first or second position), none or the rudimentary voltage impulse may be effected now. If after the magnetization of the Wiegand wire the permanent magnet arrangement then changes its movement direction again, the counting sensor according to the invention, after the detection of the voltage impulse, may obtain direction information and magnetic pole information, which may be identical to the preceding ones. As has been explained, the error detection then may recognize that an error is present.

Due to the explained movement sequence, the tracking storage may only contain tracking information, which may indicate, that a particular one of the magnetic poles of the permanent magnet arrangement has written the tracking information into it [the tracking storage] after the erasure. As a function of where the tracking position, at which the tracking storage is arranged, is located, for example on the virtual line at a position, which may correspond to the one or to the other end of the Wiegand wire, the tracking information may indicate that the tracking storage has been written into by the south pole or the north pole.

For the other case explained, in which a rudimentary voltage impulse is effected, the situation may be equivalently. If the north pole or the south pole of the permanent magnet arrangement moves to the first and/or to the second position, the generation of the voltage impulse may be effected in this position. If, starting from this position (first or second position), the corresponding pole may move further without change of its movement direction, the case may occur that upon the other pole reaching the position (first or second position) corresponding to the movement direction, a rudimentary voltage impulse may be effected and only the voltage impulse, which may be effected subsequently to this, may not be rudimentary. However, this voltage impulse, which may not be rudimentary, may result in direction information and magnetic pole information, which may be identical to the preceding ones. The error detection may then recognize that an error is present.

Due to the movement sequences, which have been described, the tracking storage can only contain tracking information, which may indicate, that a particular magnetic pole may have written the tracking information into it. Which one of the magnetic poles of the permanent magnet arrangement this is, may depend in turn on where the tracking position is arranged, wherein in the second movement sequence described, and in comparison to the first case above, the particular magnetic pole may be the opposite one.

Preferably, the processing electronic circuit of the counting sensor may be configured, upon the generation of the voltage impulse, to read out the tracking information from the tracking storage before the tracking information may be erased.

The reading out may be effected preferably, if the voltage of the voltage impulse exceeds a lower voltage threshold, and the erasure of the tracking information may be effected in particular then, if the voltage exceeds an upper voltage threshold, which is above the lower voltage threshold.

In a further preferred embodiment of the counting sensor according to the invention, the processing electronic circuit of the counting sensor according to the invention may preferably be configured (i) to possibly store the magnetic pole information, if the voltage impulse generated by the Wiegand module exceeds a medium voltage threshold, wherein the previously stored magnetic pole information may be transferred into the tracking storage and may serve as the tracking information, if (or when) the voltage impulse, which may be generated by the Wiegand module, exceeds a lower voltage threshold, which may be below the medium voltage threshold, and (ii) to possibly determine the number of the rotations or of the linear displacements of the object on the basis of the direction information and the magnetic pole information, and to possibly store the corresponding value in the data storage, if (or when) the voltage impulse, which may be generated by the Wiegand module, exceeds an upper voltage threshold, which may be above the medium voltage threshold.

Preferably, the direction information may be determined by the processing electronic circuit only, if (or when) the voltage impulse generated by the Wiegand module exceeds the upper voltage threshold.

The magnetic pole information may be stored, for example, in the corresponding storage cell of the mentioned shift register storage or of the mentioned internal storage, if (or when) the voltage impulse exceeds the medium voltage threshold. In this case, the processing electronic circuit may be configured such that it may not loose the magnetic pole information, which may be stored in the storage cell of the shift register storage/internal storage between two voltage impulses. Alternatively, the processing electronic circuit may store the magnetic pole information in a temporary storage, which may be provided for this purpose, upon exceeding the medium voltage threshold, wherein the temporary storage may concern, for example, a reserved storage cell in the volatile and/or in the non-volatile data storage.

In this embodiment, the tracking storage may be a reserved storage cell in the data storage, for example, in the volatile and/or in the non-volatile data storage, or in the shift register storage or in the internal storage.

In a further preferred embodiment, the counting sensor according to the invention, alternatively and preferably, may have a further magnetic-field-sensitive temporary storage, which may be directly written into by the north pole or the south pole of the permanent magnet arrangement, and which may store magnetic pole data, which may indicate whether the temporary storage has been written into by the north pole or by the south pole; and the processing electronic circuit may be configured to possibly read out the magnetic pole data from the temporary storage and to possibly transfer them into the tracking storage, if (or when) the voltage impulse, which may be generated by the Wiegand module, exceeds a lower voltage threshold, and subsequently to possibly allow an overwriting of the magnetic pole data, which may be stored in the magnetic-field-sensitive temporary storage, and to possibly determine the number of the rotations or of the linear displacements of the object on the basis of the direction information and the magnetic pole information, and to possibly store the corresponding value in the data storage, if the voltage impulse, which is generated by the Wiegand module, exceeds an upper voltage threshold, which may be above the lower voltage threshold.

Preferably, the processing electronic circuit may be configured to allow the overwriting of the magnetic pole data, if (or when) the voltage impulse, which may be generated by the Wiegand module, exceeds a medium voltage threshold.

The lower, medium and upper voltage thresholds of all embodiments may be monitored in particular by comparing the voltage of the capacitor, which may be charged by the Wiegand module, with the voltage thresholds.

In this embodiment, the tracking storage may be a reserved storage cell in the data storage, for example in the volatile and/or in the non-volatile data storage, or in the shift register storage/in the internal storage.

For both variants, in which the magnetic pole information may be transferred into the tracking storage, a basis may be formed by the insight that the movement sequence with the constant movement direction of the permanent magnet arrangement, in which a rudimentary voltage impulse may occur, may always result in a voltage impulse, which may, as the case may be, be rudimentary, and which may not be sufficient for the determination of the number of the rotations or of the linear displacements as well as for the storing of the corresponding value, which though may provide sufficient energy to possibly at least determine and to possibly store the magnetic pole information.

Further preferably, if, in said sequence, consecutive direction informations are identical and consecutive magnetic pole informations are different, the error detection may provide a result to the effect that no error may be present, and the number of the rotations or of the linear displacements of the object may be determined correspondingly and the corresponding value is stored in the data storage.

In this case, the tracking information may not be relevant.

This may hold in particular, if the processing electronic circuit determines the number of the rotations or of the linear displacements directional-dependently or direction-independently, and if the values in said sequence are different consecutively only in respect of the magnetic pole informations.

Further preferably, if, in the sequence, consecutive direction informations and magnetic pole informations are different, the error detection may provide a result to the effect that an error may be present, and the correction may be determined to the effect that the value in the data storage may be supplemented.

In this case, the tracking information may not be relevant.

This may holds in particular, if the processing electronic circuit determines the number of the rotations or of the linear displacements directional-dependently or directional-independently, and if the values in said sequence are different consecutively in respect of the direction informations and the magnetic pole informations.

Further preferably, if, in the sequence, consecutive direction informations are different and consecutive magnetic pole informations are identical, the error detection may provide a result to the effect that no error may be present, and the number of rotations or of linear displacements of the object may be determined accordingly and the corresponding value may be stored in the data storage.

In this case, the tracking information may not be relevant.

This may hold, for example, if the processing electronic circuit determines the number of the rotations or of the linear displacements directional-dependently or directional-independently, and if the values in the sequence are different consecutively only in respect to the direction informations.

The sensor element of the consequence according to the invention maybe, for example, an additional coil, which may additionally surround the Wiegand wire, and the processing electronic circuit may be configured to possibly obtain the direction information by evaluating a temporal occurrence of the output signal of the additional coil in relation to the voltage impulse.

In particular, the additional coil may be spatially offset with respect to the coil of the Wiegand module.

The processing electronic circuit may be configured to possibly evaluate the temporal occurrence of the output signal and/or of the voltage impulse of the additional coil with respect to the voltage impulse of the coil of the Wiegand module, and to possibly determine on this basis whether the permanent magnet arrangement moves in said one direction or in the direction that may be opposite to said one direction.

The processing electronic circuit may obtain the magnetic pole information by evaluating the polarity of either the voltage impulse from the coil of the Wiegand module or of the voltage impulse from the additional coil.

Alternatively, the sensor element may be at least a first Hall element, wherein the first Hall element may be arranged such that the processing electronic circuit may obtain the direction information by evaluating the output signal of the first Hall element.

As has been explained in the preceding, it is believed that the magnetic domains of the Wiegand wire may change their orientation abruptly, if (i) the permanent magnet arrangement moves in said one direction and one of the magnetic poles of the permanent magnet arrangement reaches the first position, or if (ii) the permanent magnet arrangement moves in the direction that may be opposite to said one direction and one of the magnetic poles of the permanent magnet arrangement reaches the second position.

The arrangement (or positioning) of the first Hall element may preferably be selected such that after the detection of the voltage impulse from the Wiegand module, the first Hall element (i) possibly provides no output signal, if the permanent magnet arrangement moves in said one direction and one of the magnetic poles of the permanent magnet arrangement is located at the first position, and (ii) possibly provides an output signal, if the permanent magnet arrangement moves in the direction that is opposite to said one direction and one of the magnetic poles of the permanent magnet arrangement is located at the second position.

Alternatively, the first Hall element may also be arranged such that, after the detection of the voltage impulse, it may always provide an output signal independently of the direction, in which the permanent magnet arrangement may move. In this case, for the obtainment of the direction information, the processing electronic circuit may evaluate the output signal of the first Hall element by putting the magnetic pole that may be recognized by the first Hall element in relation with the polarity of the voltage impulse.

Particularly preferably, the counting sensor may comprise a further sensor element in the form of a second Hall element, wherein the first Hall element and the second Hall element may be arranged such that the processing electronic circuit (i) possibly redundantly obtains the direction information by the evaluation of the output signal of the first Hall element and the output signal of the second Hall element, and (ii) possibly redundantly obtains the magnetic pole information by the determination of the polarity of the voltage impulse, which may be generated by the coil of the Wiegand module, by the evaluation of the output signal of the first Hall element and by the evaluation of the output signal of the second Hall element.

The first and the second Hall element may be, preferably, arranged on a measurement substrate, which may define a measurement plane, wherein the Hall elements may be arranged on the measurement substrate such that their magnetic-field-sensitive areas may extend within the measurement plane and/or form a part of the measurement plane.

Preferably, the Hall elements and the processing electronic circuit may be integrated on the measurement substrate in a common integrated circuit, which may be based either on a unitary integration technology, for example the CMOS technology, or on different integration technologies, for example the CMOS and the FRAM technology.

In the autonomous mode, in which the counting sensor may not be supplied with outside energy, the first and the second Hall element and the processing electronic circuit may be supplied with energy, which may be provided by the Wiegand module.

The first Hall element and the second Hall element may be arranged such that the processing electronic circuit may obtain at least redundant direction information about whether the permanent magnet arrangement moves in said one direction or in said opposite direction by the evaluation of the output signal of the first Hall element and the output signal of the second Hall element.

The processing electronic circuit, for the obtainment of the redundant direction information, may evaluate the output signals of the Hall elements preferably by comparing the output signals and/or output voltages of the Hall elements with voltage thresholds, which may have been fixed correspondingly.

Preferably, the first Hall element and the second Hall element may be arranged such that the processing electronic circuit may obtain redundant direction and magnetic pole information about whether the north pole or the south pole is located at the first or at the second position and whether the permanent magnet arrangement moves in said one direction or in said opposite direction, by the evaluation of the voltage impulse from the Wiegand module, the output signal of the first Hall element and the output signal of the second Hall element.

The mentioned redundant direction and magnetic pole informations may be obtained by the processing electronic circuit in particular, if the first Hall element and the second Hall element are arranged such that they output output signals, which may have different heights (or strengths) (in respect of their amount, in respect of their signal strength) as a function of whether, after the detection of the voltage impulse, the north or the south pole may be located at the first or the second position.

Particularly preferred, the first Hall element may be arranged corresponding to the first position and the second Hall element may be arranged corresponding to the second position.

Stated differently, upon movement of the permanent magnet arrangement in said one direction, the first Hall element may output an output signal corresponding to the north pole or to the south pole upon occurrence and/or after the detection of the voltage impulse of the Wiegand module, wherein the second Hall element may output no output signal upon the occurrence and/or after the detection of the voltage impulse. Upon reversal of the movement direction of the permanent magnet arrangement, i.e. if the permanent magnet arrangement moves in said opposite direction, the second Hall element may output an output signal corresponding to the north pole or to the south pole upon occurrence and/or after detection of the voltage impulse, wherein the first Hall element may provide no output signal upon occurrence and/or after the detection of the voltage impulse.

The redundant direction informations in respect of the movement direction of the permanent magnet arrangement may be obtained by the processing electronic circuit by evaluating the different output signals of the Hall elements, whereas the redundant magnetic pole information with respect to the polarity of the permanent magnet arrangement, i.e. whether the north pole or the south pole is located at the first or at the second position, may be obtained by the processing electronic circuit by the output signal of the Hall element associated to the corresponding position and by the polarity of the voltage impulse, which is output by the Wiegand module.

Alternatively, the mentioned redundant direction and magnetic pole information may be obtained by the processing electronic circuit in particular, if the first Hall element and the second Hall element are arranged such that, after the detection of the voltage impulse, they output output signals possibly having equal heights (with respect to their amount, with respect to their signal strength) as a function of whether the north pole or the south pole may be located at the first or at the second position.

In this case, for the obtainment of the redundant direction informations, the processing electronic circuit may evaluate the output signals of the first and of the second Hall elements by putting the magnetic pole that has been recognized by the first Hall element in relation with the polarity of the voltage impulse, and likewise putting in relation the magnetic pole recognized by the second Hall element in relation with the polarity of the voltage impulse.

The redundant magnetic pole informations are obtained by evaluating the output signals of the first and/or of the second Hall element and by the polarity of the voltage impulse output by the Wiegand module.

DETAILED DESCRIPTION OF EXEMPLARY EMBODIMENTS

In the following, preferred embodiments of the invention are explained with reference to the appended figures.

FIG. 1 shows a perspective view of a first preferred embodiment of a counting sensor 1000 according to the invention.

Figure 1:
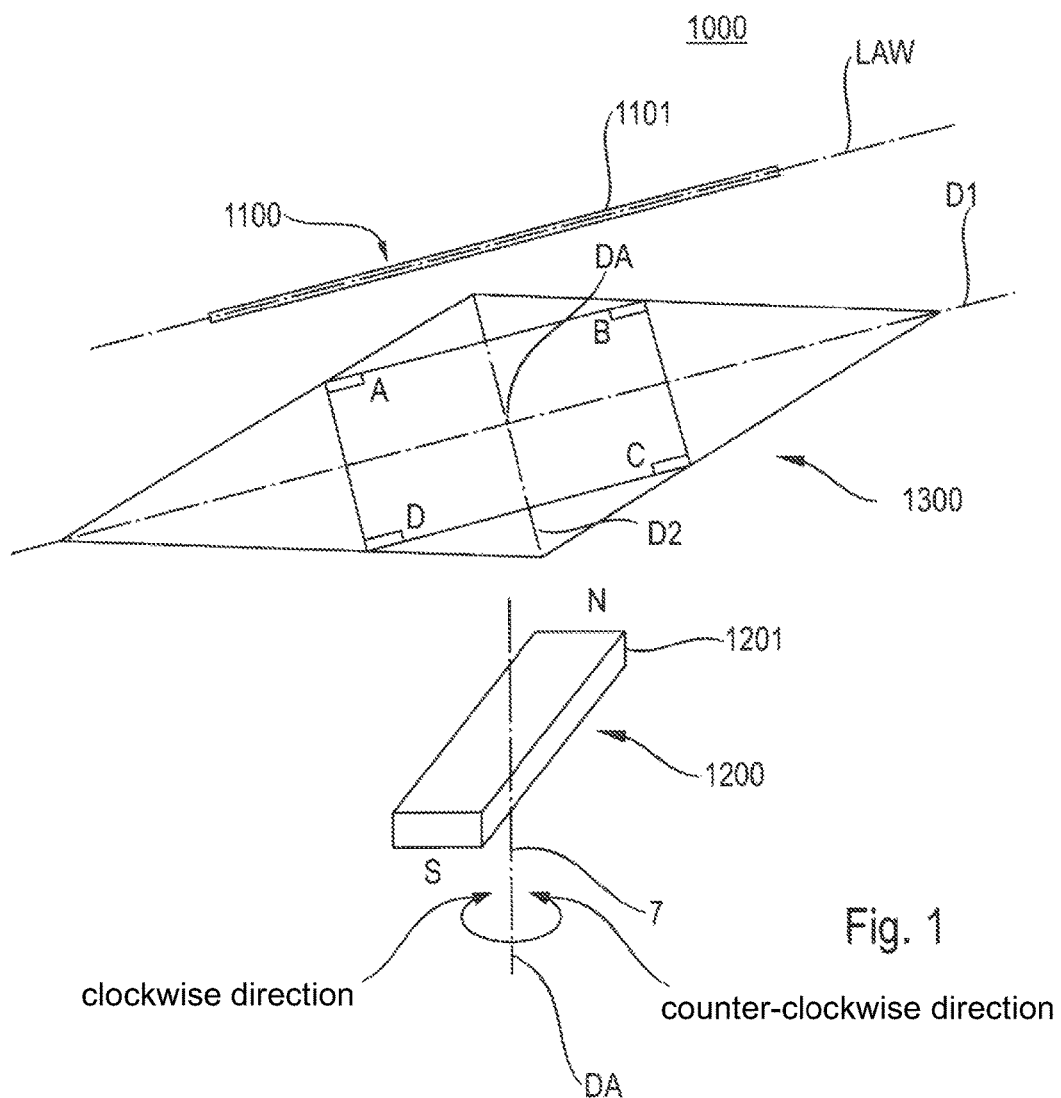
FIG. 1 shows a perspective view of a counting sensor according to the invention according to a first preferred embodiment of the invention.

The counting sensor 1000 may comprise a Wiegand module 1100, which may have, on the one hand, a Wiegand wire 1101 and, on the other hand, a coil which may be wound around the Wiegand wire 1101 and which is not shown, and a permanent magnet arrangement 1200 which may be composed of a rectangular-shaped permanent magnet 1201 in this first preferred embodiment. The permanent magnet 1201 may also be cylinder-shaped or may have any other regular shape.

The permanent magnet arrangement 1200 may be supported rotatably such that a north pole N and a south pole S of the permanent magnet arrangement 1200 can rotate about a rotation axis DA. The rotation direction may either be effected in one direction, for example the clockwise direction, or in a direction that is opposite to said one direction, the counter-clockwise direction.

In an intended use of the counting sensor 1000, the permanent magnet arrangement 1200 may be fixed to a rotating object to be monitored, such that the rotation axis DA of the permanent magnet arrangement 1200 may correspond to the rotation axis of the object and such that thus the permanent magnet arrangement 1200 may rotate together with the object to be monitored.

The Wiegand wire 1101 may be composed of a soft-magnetic core and a hard-magnetic shell. Upon a rotation of the permanent magnet arrangement 1200, the magnetic domains and/or the Weiß domains of the Wiegand wire may abruptly change their orientation as from a particular change and/or rotation of the magnetic field, whereby in result from this, a voltage impulse may be effected, which may be output from the coil that may be wound around the Wiegand wire 1101 and/or may surround the Wiegand wire. Due to the formation of the Wiegand wire 1101 from soft- and hard-magnetic regions (core and shell), the abrupt (or sudden) change of the orientation of the domains may be effected, as a function of the rotation direction of the permanent magnet arrangement 1200, in different postures of the permanent magnet arrangement 1200.

If, starting from a posture, in which a longitudinal axis of the rectangular-shaped permanent magnet may be oriented parallel to a longitudinal axis LAW of the Wiegand module 1100, the permanent magnet arrangement 1200 may rotate, for example, in the clockwise direction, the abrupt change of the orientation of the domains may be effected after a rotation of the rectangular-shaped permanent magnet 1201 about ca. 135°. In this posture of the permanent magnet 1201, either the corresponding north pole N or the south pole S may be located at a first position.

If in contrast thereto, starting from the starting posture as explained, the permanent magnet arrangement 1200 may rotate in the counter-clockwise direction, the abrupt change of the orientation of the domains may occur again after a rotation of the rectangular-shaped permanent magnet 1201 about ca. 135°, wherein in this posture of the permanent magnet 1201 the north pole N or the south pole S may be located at a second position, which may be different from the first position.

The counting sensor 1000 according to the invention according to the first preferred embodiment of the invention may comprise, besides the Wiegand module 1100 and the permanent magnet arrangement 1200, also a measurement substrate 1300, which may preferably have a square shape. The measurement substrate 1300 may be located between the Wiegand module 1100 and the permanent magnet arrangement 1200, as can be seen in FIG. 1, wherein the measurement substrate 1300 may define a measurement plane, which may extend parallel to the plane of movement, in which the square-shaped permanent magnet 1201 may be rotating.

Figure 2:
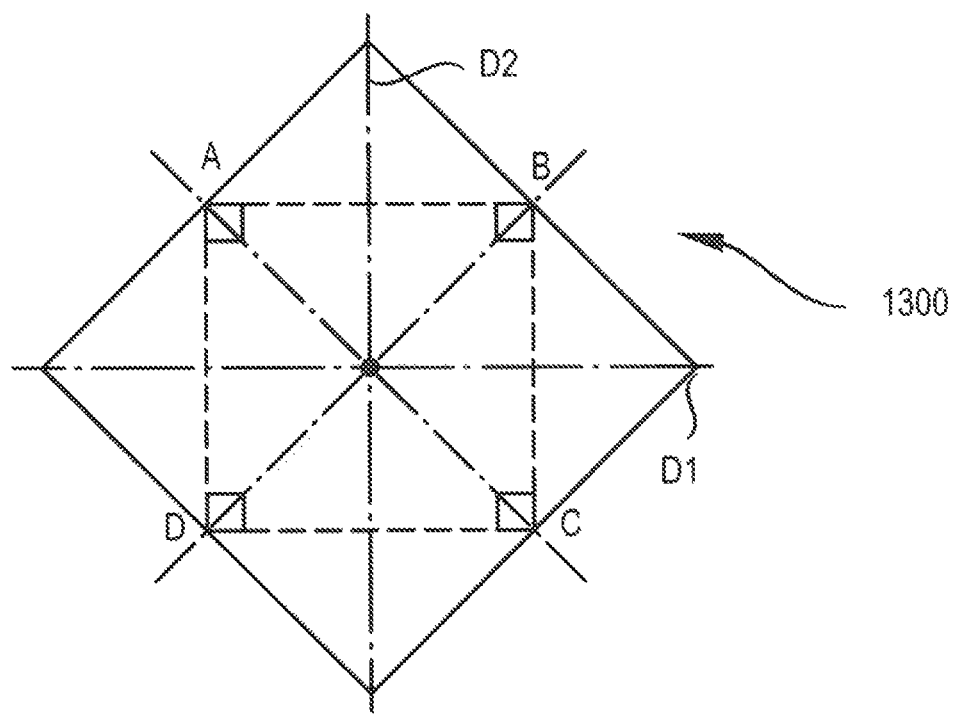
FIG. 2 shows a measurement substrate, which may be used in the counting sensor according to the first or to the second preferred embodiment.

A plurality of sensor elements in the form of Hall elements A to D may be arranged on the measurement substrate 1300. The plurality of Hall elements is well visible both in the perspective view according to FIG. 1 and also in the top view of the measurement substrate 1300 shown in FIG. 2. FIG. 2 corresponds to a view of the measurement substrate 1300 in the direction of the rotation axis DA, which may penetrate the measurement substrate 1300 in its center point, and which may run perpendicular to the plane of the drawing.

The four Hall elements A to D that are depicted may form a part of the counting sensor according to the invention, wherein their output signals may be evaluated in an autonomous mode, which is still to be explained, for determining the position and the rotation direction of the permanent magnet arrangement 1200.

All the Hall elements may preferably be arranged on the measurement substrate 1300 such that their magnetic-field-sensitive active areas may extend in the measurement plane.

Each one of the Hall elements A to D may be, respectively, located both at an outer edge of the measurement substrate 1300 as well as at a center of an edge of the respective outer edge of the measurement substrate 1300.

The Hall elements A to D each may comprise respective four terminals, wherein two of the terminals may form the current contacts and the other two terminals may form the Hall voltage contacts of the corresponding Hall elements.

Alternatively, the Hall elements A to d may also be octagonal-shaped Hall elements, which may have, respectively, eight terminals, wherein also in this case, respectively, a diagonal, which may connect two opposing corners of the corresponding octagonal-shaped Hall element, may be perpendicular to the corresponding outer edge. In this case, two respective opposing terminals may form the current contacts, and the two respective terminals, which may be orthogonal to the current contacts, may form the Hall voltage terminals.

For eliminating interference fields and interference parameters in the output signals, the corresponding output signals of the Hall elements A to D may be evaluated pair-wisely according to the difference principle. In this relation, the output signals of the Hall elements A and C may be evaluated such that the portions of the output signals, which may be based on the magnetic field components, which may penetrate the Hall elements A and C and which may be oriented oppositely, may add to one another, whereas the portions of the output signals, which may be based on magnetic field components, which may penetrate the Hall elements A and C and which may be oriented likewise, may subtract from one another and thus may cancel one another. The output signals of the other two Hall elements B and D may be evaluated likewise.

The Hall elements A to D may be required in particular in an autonomous mode, in which the counting sensor 1000 may not be supplied with outside energy, for the determination of the value, which may reflect the number of the rotations and/or the turns of the permanent magnet arrangement 1200.

In FIG. 2, the horizontal diagonal D1 of the measurement substrate 1300 may correspond to the orientation of the longitudinal axis LAW of the Wiegand module 1100. If the permanent magnet 1201 of the permanent magnet arrangement 1200 rotates about the rotation axis DA in the clockwise direction, the abrupt change of the magnetic domains of the Wiegand wire 1101 may be effected, as has been explained already in the preceding, if (or when) the north pole N or the south pole S is located at the first position that has been explained already.

As can be seen from the FIGS. 1 and 2, this first position may correspond, in the measurement plane, approximately to the position of the Hall element B. Stated otherwise, the first position and the position of the Hall element B may be located one behind the other and/or one above the other in the direction of the rotation axis DA.

Stated differently, in the first position, the north pole N or the south pole S of the permanent magnet 1201 may be located above the Hall element B.

If the permanent magnet arrangement 1200 is located in the posture, in which one of the poles is located at the first position, the respective other magnetic pole may stand in the same spatial relationship to the Hall element D. In this posture, the magnetic field, which may be generated by the permanent magnet arrangement 1200, may penetrate the magnetic-field-sensitive active areas of the Hall elements B and D in respective opposite directions, such that the output signals, which may be evaluated according to the difference principle, may add to one another. The other pair of Hall elements A and C may hardly sense (or detect) the magnetic field of the permanent magnet arrangement 1200 in this posture of the permanent magnet arrangement 1200 due to their spatial offset, which may be why their output signals (already because of the difference principle) may tend towards zero, if (or when) the north pole N or the south pole S of the permanent magnet arrangement 1200 is located at the first position and the coil of the Wiegand module 1100 outputs the voltage impulse.

Upon a movement of the permanent magnet arrangement 1200 in the opposite direction, i.e. upon rotation of the rectangular-shaped magnet 1201 in the counter-clockwise direction, the abrupt change of the orientation of the magnetic domains of the Wiegand wire 1101 may be effected in an equivalent manner, if (or when) the north pole N or the south pole S of the permanent magnet arrangement 1200 is located at a second position, which is different from the first position.

The second position may correspond to the Hall element C. If the north pole N or the south pole S is located in that second position, the respective other magnetic pole may stand in the same spatial relationship to the Hall element A. The output signals of the Hall elements A and C may be evaluated in the same manner as those of the Hall elements B and D.

In the normal case, as a function of in which direction the permanent magnet arrangement 1200 rotates, direction information can be obtained from the output signals of the pairs of the Hall elements A, C and B, D about whether the permanent magnet arrangement 1200 moves in said one direction—the clockwise direction—or in the direction that may be opposite to said one direction—the counter-clockwise direction.

Moreover, also the magnetic pole information may be detected from the polarity of the output signals of the Hall elements A, C and B, D, i.e. whether the north pole N or the south pole S is located at the first or at the second position.

In this respect, in the autonomous mode, the resolution of the counting sensor according to the invention may amount to one half turn (or rotation).

Theoretically, the number of the Hall elements A to D can be reduced. For example, all but one single Hall element could be omitted. The conclusion to the rotation direction of the permanent magnet arrangement 1200 and/or the direction information can be drawn from the output signal of the remaining Hall element upon the occurrence and/or after the detection of the voltage impulse of the Wiegand module 1100. Namely, if the Hall element provides no output signal upon the occurrence and/or after the detection of the voltage impulse, one may start from the assumption, that the permanent magnet arrangement 1200 rotates in the direction, for which no Hall element is conceived. The magnetic pole information about how the polarities of permanent magnet 1201 are oriented in this state, can be determined from the polarity of the voltage impulse of the Wiegand module.

On the contrary, if the remaining Hall element provides output signals, one may start from the assumption, that the permanent magnet arrangement 1200 rotates in the corresponding direction.

In the autonomous mode, for the determination of the number of the rotations, the output signals of the pair of the Hall elements A, C may be evaluated according to the difference principle, and the output signals of the pair of the Hall elements B, D may also be evaluated according to the difference principle.

Figure 3:
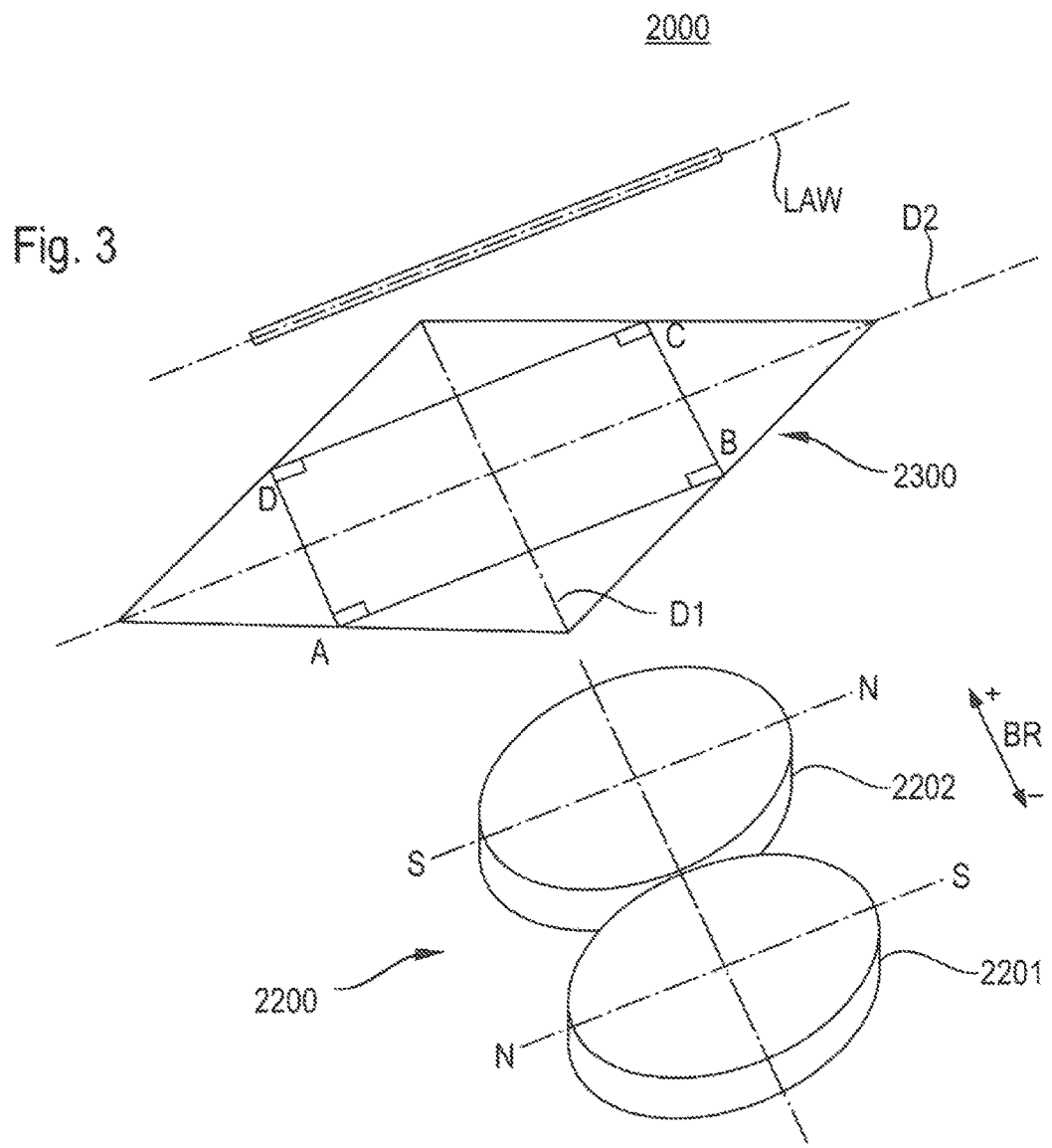
FIG. 3 shows a counting sensor according to the second preferred embodiment of the invention, wherein the counting sensor is configured to detect a linear displacement of a permanent magnet arrangement, which is composed of at least two permanent magnets.

FIG. 3 shows a second preferred embodiment of a counting sensor 2000 according to the invention.

The difference to the counting sensor 1000 according to the first preferred embodiment may consist in that the counting sensor 2000 according to the second preferred embodiment cannot recognize rotations, but linear displacements.

The counting sensor 2000 may comprise a Wiegand module 1100, which may be identical to that of the first preferred embodiment, which may be why reference may be made to the corresponding explanations.

Moreover, the counting sensor 2000 may also comprise a permanent magnet arrangement 2200, which may be composed of at least two cylinder-shaped permanent magnets 2201, 2202 in this embodiment. However, the permanent magnets 2201, 2202 may also have other shapes.

In an intended use, the permanent magnet arrangement 2200 may be linearly displaced along the shown movement direction BR. In this case, the movement may be effected in said one direction, the positive movement direction BR, or in a direction that may be opposite to this, the negative movement direction BR. The permanent magnets 2201, 2202 may be polarized oppositely and may be oriented such that their north pole-south pole axes may be oriented perpendicular to the movement direction BR.

The counting sensor 2000 may also comprise a measurement substrate 2300, on which a plurality of sensor elements in the form of Hall elements and a processing electronic circuit may be arranged, too.

The measurement substrate 2300 may be identical to that of the first embodiment except for the difference, that not the output signals of the Hall elements, which may lie on the diagonals of the virtual square and/or rectangle, may be jointly evaluated, but those of the Hall elements, which may lie on one side of the measurement substrate 2300 with respect to the diagonal D2, may be jointly evaluated (in FIG. 3, the sequence of the reference numerals A to D, which may be used, is slightly different in comparison to that of FIG. 1). With view to FIG. 3 this may mean that for the determination of the value, which may indicate the number of the repeating linear displacements, the output signals of the Hall elements A, B may be evaluated jointly and/or synchronously (at the same time).

The same may hold for the evaluation of the output signals of the Hall elements C, D.

The diagonal D1 of the measurement substrate 2300, which may run perpendicular to the diagonal D2, may be congruent with the symmetry axis of the permanent magnets 2201, 2202, which may run in the movement direction BR, when seen in the direction perpendicular to the measurement substrate 2300. Stated differently, the plane, in which the symmetry axis of the permanent magnets 2201, 2202, which may point in the movement direction BR, and the diagonal D1 may be lying, may be perpendicular to the measurement plane.

In FIG. 3, if the permanent magnet arrangement 2200 moves in said one direction or in the direction that may be opposite to this (positive or negative BR direction), this may result in a change/re-polarization of the magnetic field experienced by the Wiegand module 1100. This change of the magnetic field may lead, as from a particular amplitude, to the already explained abrupt change of the orientation of the magnetic domains of the Wiegand wire 1101 and thus to the generation of a voltage impulse by the coil of the Wiegand module 1100. Due to the formation of the Wiegand wire 1101 from soft-magnetic and hard-magnetic regions, the triggering of the voltage impulse may be effected in such different positions of the permanent magnet arrangement 2200 (first and second position) that in the normal case the direction information about the movement direction of the permanent magnet arrangement 2200 and the magnetic pole information about the orientation of the detected permanent magnet 2201 or 2202 can be obtained from the output signals of the Hall elements A, B and/or C, D.

If the permanent magnet arrangement 2200 moves, for example, in the positive direction shown in the FIG. 3, upon triggering the voltage impulse, the south pole of the permanent magnet 2201 may be located at the first position corresponding to the Hall element B, and the north pole may be positioned at the Hall element A. Stated differently, the Hall elements A, B and the magnetic poles of the permanent magnets 2201 may be arranged one above the other in the direction perpendicular to the movement direction BR. Both Hall elements may output a corresponding signal, whereas the Hall elements C, D may be located, in this state, approximately between the permanent magnets 2201, 2202, and accordingly may output no and/or very small output signals.

By contrast, if the permanent magnet arrangement 2200 moves in the negative direction shown in FIG. 3, upon triggering of the voltage impulse, the north pole of the permanent magnet 2202 may be located at the Hall element C, which may correspond to the second position, and the south pole may be located at the Hall element D. Stated differently, the Hall elements C, D and the magnetic poles of the permanent magnet 2202 may be arranged one above the other in the direction perpendicular to the movement direction BR. Both Hall elements C, D may output a corresponding signal, whereas the Hall elements A, B may in this state be approximately between the permanent magnets 2201, 2202, and accordingly may output no and/or very small output signals.

Theoretically, also in this embodiment, the number of Hall elements can be reduced to one single one.

Figure 4:
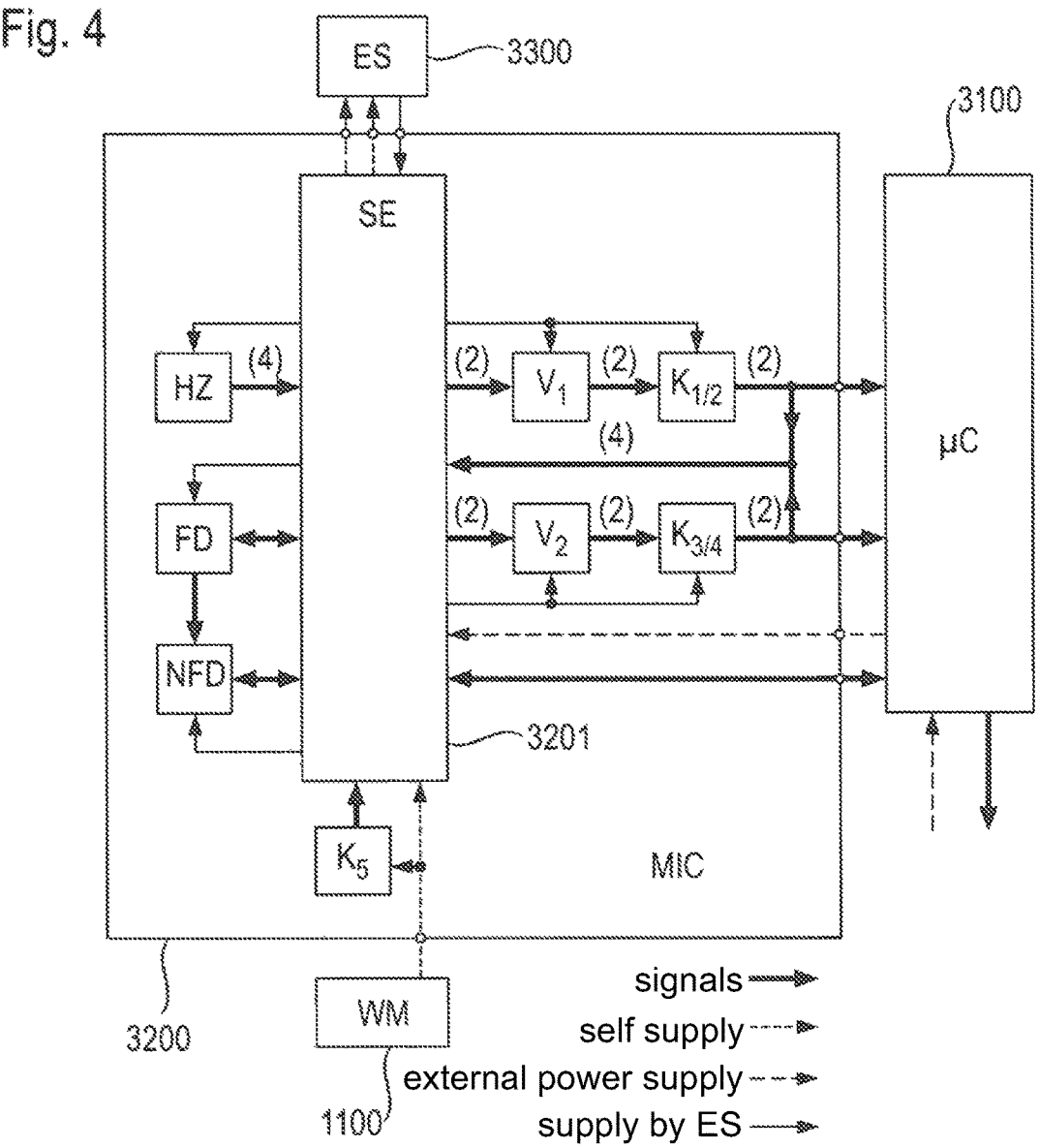
FIG. 4 shows the schematic composition of the overall electronic circuitry, which can come to application in the counting sensor according to the first preferred embodiment and the second preferred embodiment.

FIG. 4 shows schematically the composition of the overall electronic circuitry of the counting sensor according to the first or the second preferred embodiment of the invention.

The overall electronic circuitry may comprise a processing electronic circuit, which may be electrically connected to the Hall elements HZ, a micro-controller 3100, the Wiegand module 1100, and an energy storage 3300. All the elements, which are contained in FIG. 4 in the square that is referenced with MIC, may be arranged on the respective measurement substrate. Preferably, the processing electronic circuit may be integrated on the measurement substrate. The Wiegand module 1100 may be arranged on a printed circuit board, on which, for example, the measurement substrate, the energy storage 3300 and the micro-controller 3100 may be located, too.

The processing electronic circuit may be arranged completely on the measurement substrate 2300, wherein all the elements of the processing electronic circuit and the Hall elements may be preferably based on an identical integration technology. Preferably, the measurement substrate may concern a silicon substrate, on which all elements may be realized, for example, in the CMOS integration technology.

In the following, the overall electronic circuitry is described under the assumption, that the counting sensor comprises the four Hall elements A to D for the determination of the value, which may indicate the number of the rotations and/or of the linear displacements.

The counting sensor according to the invention may determine the number of the rotations or of the linear displacements preferably directionally dependently (or as a function of the direction), i.e. a positive sign may be associated to one movement direction, wherein the rotations or the linear displacements in this direction may result in an increase of the respective number, and a negative sign may associated to the opposite direction, wherein the rotations or the linear displacements in the opposite direction may result in a decrease of the particular number.

In FIG. 4, the shortly-dashed lines/arrows symbolize the course of the self-energy supply, the longly-dashed lines/arrows symbolize the course of the outside energy supply, the thinly-drawn lines/arrows symbolize the course of the supply by the energy storage 3300, and the thickly-drawn lines/arrows the course of the signals.

The counting sensor according to the first and the second preferred embodiment may be operated either in a non-autonomous mode, in which the counting sensor may be supplied with outside energy, or in an autonomous mode, in which the counting sensor may be supplied with energy, which is stored in the energy storage 3300.

(Non-Autonomous Mode)

In the non-autonomous mode, the outside energy supply may be effected via the micro-controller 3100, which may be electrically connected to the control electronics SE for this purpose. The control electronics SE may charge the energy storage ES 3300, which may be preferably composed of one or plural capacitors, with the outside energy. Particularly preferably, the energy storage ES 3300 may be composed of at least two capacitors, which may have different capacities, wherein a smaller capacitor, which may have a smaller capacity and a larger capacitor, which may a larger capacity may be provided, which may both be charged with the received outside energy in the non-autonomous mode.

The four Hall elements A to D, which are referenced by HZ in the FIG. 4, may be supplied with energy from the energy storage ES. Since the energy storage ES may be charged with outside energy at least in the non-autonomous mode, the Hall elements HZ may be supplied indirectly with the outside energy, such that all Hall elements may output output signals consecutively according to the magnetic poles as a function of the movement direction of the permanent magnet arrangement.

The four Hall elements HZ may be connected to the control electronics SE, and may output, respectively, their four output signals to the control electronics SE, which may process the respective two output signals of the pairs of the Hall elements according to the difference principle, and thus in result may obtain one signal per pair of Hall elements.

The two signals, which may be obtained in result for both pairs, may be output block-wisely via a first amplifier V1 to two comparators K1/2 and block-wisely via a second amplifier V2 to two comparators K3/4. Two of the comparators may perform a comparison with a negative voltage threshold, and the other two of the comparators may perform a comparison with a positive voltage threshold, such that each signal, which may in result be obtained according to the difference principle, may be compared with a positive and with a negative voltage threshold.

The output signals of the comparators K1 to K4, which may be obtained, may be, on the one hand, returned to the control electronics SE, and, on the other hand, output to the micro-controller 3100. The output signals of the comparators K1 to K4, which may be obtained, may allow an interpretation as to in which position the permanent magnet arrangement 1200 may be located and/or how the magnetic poles may be oriented. The continuous evaluation of the output signals of the Hall elements, which may occur sequentially, may also allow a conclusion as to in which direction the permanent magnet arrangement 1200 (clockwise direction and/or counter-clockwise direction) or 2200 (linear displacement in positive or negative movement direction) may move.

From this, the value of repeating movement sequences (rotations or number of complete linear displacements) of the permanent magnet arrangement can be determined. This determination may be effected, on the one hand, in the micro-controller 3100, which may output this value to an application, and, on the other hand, in the control electronics SE, which may store this value in a volatile data storage FD and/or in a non-volatile data storage NFD.

The four Hall elements HZ, the amplifiers V1, V2, the four comparators K1 to K4 as well as the data storages (volatile data storage FD and non-volatile data storage NFD) may also be supplied with energy from the energy storage 3300.

The volatile data storage may be, for example, a register which may be based on the CMOS technology. The non-volatile data storage NFD may be, for example, an EEPROM that may also be based on the CMOS technology. The processing electronic circuit may preferably be implemented such that it may operate without problems also at temperatures above 140° C., in particular up to 160° C. Both data storages may be implemented in particular such that they may operate without problems even at temperatures above 140° C., in particular up to 160° C., and may preserve their storage values.

If the output signals of the comparators K1 to K4 are not required in the micro-controller 3100, the output of the output signals of the comparators K1 to K4 to the micro-controller 3100 may not be necessary. In this case, the latter one may have access only to the volatile data storage and/or the non-volatile data storage, and may output the value, which may have been read out accordingly, to an application in the outside.

(Autonomous Mode)

In some applications, the case may occur that the outside energy supply may break down or may be temporarily not available. In this situation, care must be taken, that the value, which may indicate the number of the repeating movement sequences (rotations and/or number of whole linear displacements), is sensed continuously and stored, such that the value may be available upon re-establishment of the outside energy supply.

In the autonomous mode, the energy supply may be taken over by the Wiegand module 1100, which may provide voltage impulses in a corresponding frequency as a function of the velocity of the permanent magnet arrangement.

In the autonomous mode, the control electronics SE may take over the control and management of the energy supply of the processing electronic circuit, for example by rectifying the voltage impulses provided by the Wiegand module 1100 and outputting them for charging the smaller capacitor of the energy storage ES 3300. The larger capacitor may not be charged in the autonomous mode, but may only provide its energy, for example, via a diode to the smaller capacitor.

The energy storage, which may be composed of the smaller and the larger capacitor, may be charged completely and/or very strongly initially after the discontinuation of the outside energy supply.

In the autonomous mode, the smaller capacitor may supply the Hall elements HZ, the amplifiers V1/V2, the comparators K1 to K4, the data storages FD/NFD, and may be discharged in the autonomous mode by the corresponding energy consumption. The Wiegand module 1100 may provide the voltage impulses, which may be used for charging the smaller capacitor, as has already been explained.

The determination of the value, which may indicate the number of the repeating movement sequences (rotations and/or whole linear displacements), may be effected similarly as in the non-autonomous mode by evaluating the output signals of the comparators K1 to K4. A difference may consist only in that the output signals of the Hall elements, and thus of the comparators, maybe effected only, if a voltage impulse of the Wiegand module is detected. The determination, whether an evaluable voltage impulse may be present or not, may be performed by a comparator K5, which may be connected directly to the output of the coil of the Wiegand module 1100, as can be seen in FIG. 4, and which may signal to the control electronics SE, whether a voltage signal and/or a voltage impulse, which can be evaluated, may be present or not. In this connection, the comparator K5 may compare the voltage, which may be output by the coil of the Wiegand module 1100, with a voltage threshold, and may signalize to the control electronics SE that a voltage signal and/or a voltage impulse, which can be evaluated, may be present, if the voltage that may be output by the coil of the Wiegand module 1100 exceeds the voltage threshold.

As has been explained already in detail in the preceding, the voltage impulse of the Wiegand module 1100 may be triggered as a function of the direction, in which the permanent magnet arrangement may move, if the north pole or the south pole of the permanent magnet arrangement is located at the first or at the second position. Accordingly, both the orientation of the permanent magnet arrangement and also its movement direction (direction information and magnetic pole information) can be determined on the basis of the output signals of the comparators K1 to K4. On this basis, the value, which may indicate the number of the repeating movement sequences, may be determined, may be stored in the volatile storage, and may be transferred to the non-volatile storage if needed.

During operation, the case may occur, that the Wiegand module 1100 and/or its coil may output a "rudimentary" voltage impulse, which though may exceed the voltage threshold of the comparator K5, but may not provide sufficient energy in order to be able to perform the process of storing the value, which may indicate the number of the repeating movement sequences, in the volatile storage and/or in the non-volatile storage. In this case, the larger capacitor may take over the bridging energy supply by transferring the missing energy to the smaller capacitor. For example, the Wiegand module 1100 and the smaller capacitor may be implemented such that the Wiegand module 1100 may charge the smaller capacitor to 8-9 V with each voltage impulse. On the contrary, the larger capacitor may be implemented such that in a strongly charged state, it may have and/or may output a voltage of, for example 5 V. That is, the larger capacitor may transfer energy to the smaller capacitor, if the voltage of the smaller capacitor falls below 4.4 to 4.6 V (the diode is taken into account), and thus may ensure the execution of the storage process.

The larger capacitor may preferably be implemented such that it may be capable to possibly take over this bridging energy supply, starting from the discontinuation of the outside energy supply, for a minimum time period of 20 min, 30 min, 1 hour, 5 hours, 1 day or plural days, taking into account leakage currents.

In the autonomous mode, an output of the stored value to the micro-controller may not be effected for obvious reasons.

At this point, it may be noted, that the reliability of the counting sensor according to the invention may be increased strongly in particular in the autonomous mode. The reason for this may be that the determination of the movement direction of the permanent magnet arrangement may always be effected on the basis of the output signals of plural Hall elements. In the present embodiment of the electronic circuitry, the two signals, which may have been obtained according to the difference principle, may be transmitted to the four comparators K1 to K4, and the four output signals of the comparators, which may have been obtained, may be evaluated jointly and/or may be put in relation to one another. The signals, which may be output by the comparators, may comprise, upon a correct functioning of all elements, redundant direction information in respect of the movement direction of the permanent magnet arrangement, because, compulsorily, one of the pairs of Hall elements (for rotations of the permanent magnet arrangement A, C or B, D; for linear displacements of the permanent magnet arrangement A, B or C, D) may output output signals after the detection of the voltage impulse, wherein the output signals may result in an exceeding of the voltage thresholds used by the comparators K1 to K4, whereas the other pair should output no output signals.

Moreover, in the autonomous mode, the reliability may preferably also be increased by not only obtaining redundant direction information with respect to the movement direction of the permanent magnet arrangement via the comparators K1 to K4, but also redundant magnetic pole information with respect to the orientation of the poles of the permanent magnet arrangement. The evaluation of the signals, which may have been obtained by the comparators K1 to K4, may provide a conclusion about whether the north pole or the south pole of the permanent magnet arrangement is located at the first or the second position. The same magnetic pole information may be obtained redundantly in addition to this also by evaluating the polarity of the voltage impulse, which may be output by the Wiegand module 1100.

In the end, the reliability may also be increased by the larger capacitor of the energy storage ES 3300, because after a discontinuation of the outside energy supply the probability of erroneous storage processes in the mentioned minimum time period can be reduced.

(Alternative for the Hall Elements)

It has already been explained in the preceding that one single Hall element may be sufficient on the measurement substrate. In this implementation of the measurement substrate, only two comparators may be present. Alternatively, the one Hall element may be replaced by an additional coil, which may be wound around the Wiegand wire spatially offset with respect to the coil of the Wiegand module. In this case, no Hall elements may be present on the measurement substrate.

The direction information and the magnetic pole information may be obtained only one-fold, if only one single Hall element or the additional coil is applied as the sensor element.

For an increase of the reliability, a combination of an additional coil and Hall elements may also be conceivable and may be provided.

(Error Detection)

In addition or alternatively to the provision of the larger capacitor, which may be capable, in the autonomous mode, to prevent erroneous storage processes at least within the explained minimum time period by transferring its stored energy to the smaller capacitor, and additionally or alternatively to the redundant obtainment of the direction information and the magnetic pole information, the counting sensor according to the invention may correct erroneous storage processes also by the following error detection. In particular, a reliable counting sensor may be thereby provided.

Figure 5:
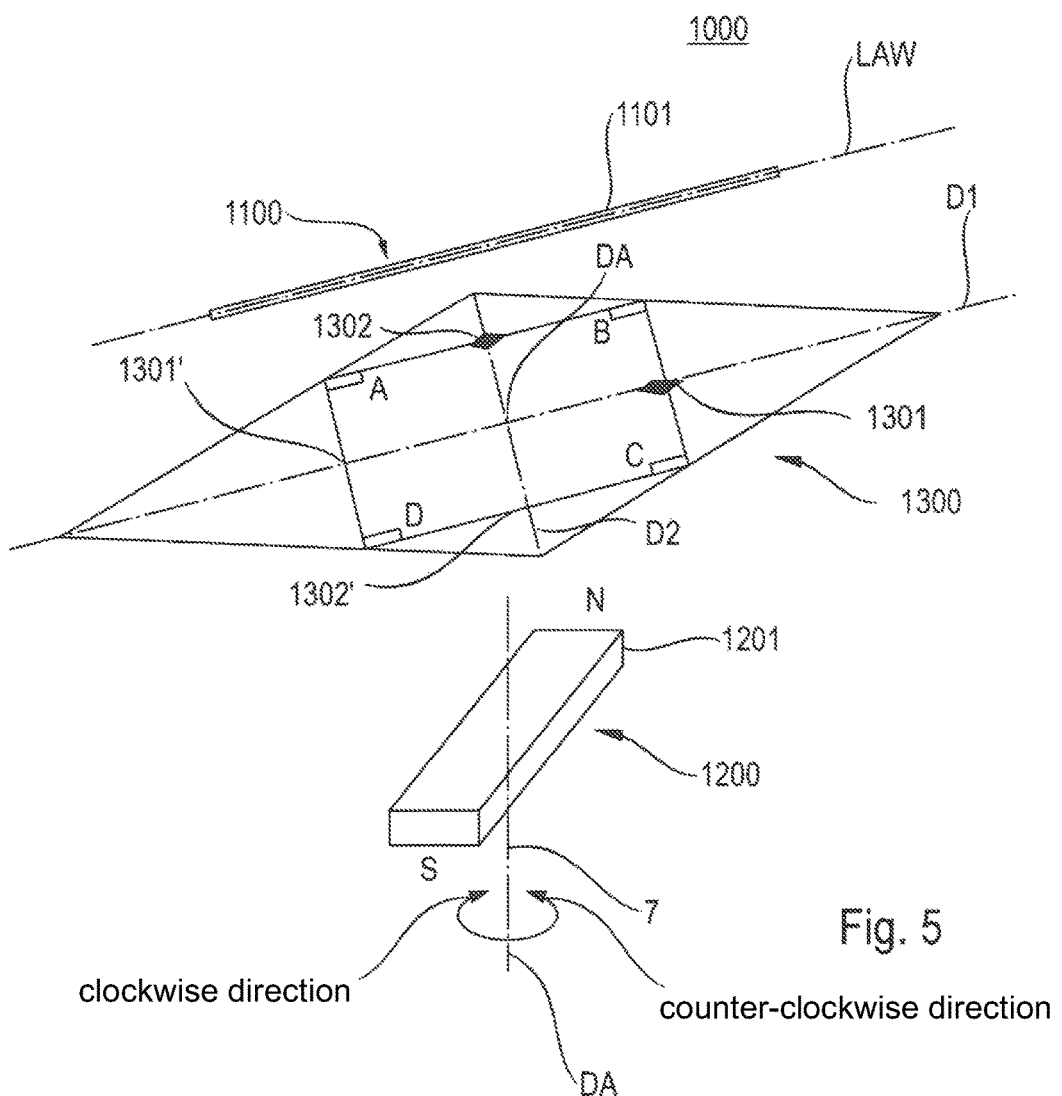
FIG. 5 shows the counting sensor according to the invention of FIG. 1, wherein the possible positions of a magnetic-field-sensitive storage and of a magnetic-field-sensitive temporary storage are indicated.

If the counting sensor according to the invention may not comprise the larger capacitor, or if this may be completely discharged, the occurrence of a rudimentary voltage impulse from the Wiegand module may result in that the determined value of the number of the rotations or of the linear displacements cannot be stored in the volatile and/or in the non-volatile storage. In this respect, the error may occur that the value that may be stored by the counting sensor may not be correct. The rudimentary voltage impulse may occur in particular in the following two cases, which are explained with reference to FIG. 5. FIG. 5 corresponds to FIG. 1, wherein possible arrangement positions (or locations) of a magnetic-field-sensitive storage 1301 and possible arrangement positions (or locations) of a magnetic-field-sensitive temporary storage 1302 are indicated. The technical function and importance of the magnetic-field-sensitive storage 1301 and of the magnetic-field-sensitive temporary storage 1302 are to be explained in the following.

a. First possible case of a rudimentary voltage impulse (runt due to direction)

In an embodiment of the permanent magnet arrangement 1200, in which the north-south-axis and/or the longitudinal axis of the permanent magnet 1201 may be oriented parallel to the longitudinal axis LAW of the Wiegand wire 1101, the magnetic domains and/or the Weiß domains of the Wiegand wire 1101 may be oriented completely according to the magnetic field of the permanent magnet 1201, because the magnetic field may act maximally on the magnetic domains or Weiß domains of the Wiegand wire 1101.

If, starting from this initial posture, the permanent magnet 1201 moves/rotates in the clockwise direction, the coil of the Wiegand wire 1100 may generate the voltage impulse, if one of the magnetic poles reaches the first position and/or the posture above the Hall element B. If the permanent magnet 1201 then changes immediately its movement direction and moves and/or rotates in the counter-clockwise direction, the magnetic pole thus may not move beyond the first position in the clockwise direction, but may change its movement direction, and the Wiegand wire 1101 may have only a partial, or even no, defined magnetization state. The Wiegand wire 1101 would assert a completely defined and desired magnetization state only then, if the magnetic pole of the permanent magnet 1201, which may be at the first position, would move further in the clockwise direction, until the north-south-axis of the permanent magnet 1201 may be again oriented parallel to the longitudinal axis LAW of the Wiegand wire 1101.

If the permanent magnet 1201 returns to its initial posture and the magnetic pole of the permanent magnet 1201, which may be previously located at the first position, thereby reaching a posture above the Hall element A, i.e. the other magnetic pole of the permanent magnet 1201 reaching the second position, the case may occur that the coil of the Wiegand module 1100 may output a rudimentary voltage impulse or even no voltage impulse.

If the movement direction of the permanent magnet 1201 changes again after reaching this second position, and if the magnetic pole of the permanent magnet 1201, which previously may have been located at the first position, now reaches the first position again, then, in this posture, a voltage impulse (this time non-rudimentary) may be effected again.

b. Second possible case of a rudimentary voltage impulse (runt due to quality)

If, starting from the mentioned initial posture, in which the north-south-axis and/or the longitudinal axis of the permanent magnet 1201 may be oriented parallel to the longitudinal axis LAW of the Wiegand wire 1101, the permanent magnet arrangement 1200 moves/rotates in the clockwise direction, the generation of a voltage impulse may be effected, if one of the magnetic poles of the permanent magnet 1201 reaches the first position above the Hall element B. If the movement direction, in which the permanent magnet arrangement 1200 moves, then does not change, such that the permanent magnet 1201 moves in the clockwise direction beyond (or over) a posture, in which the north-south-axis and/or the longitudinal axis of the permanent magnet 1201 is again oriented parallel to the longitudinal axis LAW of the Wiegand wire 1101, the next (non-rudimentary) voltage impulse should be effected, if then the opposite magnetic pole has reached the first position above the Hall element B.

However, a non-rudimentary voltage impulse must not compulsorily be the case.

In the framework of the development activities of the inventors it has been recognized that due to quality variations of the Wiegand wire 1101, even in the sketched second movement sequence, in which a direction change of the movement direction of the permanent magnet arrangement 1200 may not be effected, a rudimentary voltage impulse may result in rare cases. In the preceding example, a rudimentary voltage impulse may thus result, if the opposite magnetic pole reaches the first position under constant movement direction. The next (non-rudimentary) voltage impulse may occur, if the other magnetic pole reaches the first position under constant movement direction again.

As has already been explained, the occurrence of the explained rudimentary voltage impulse may result in that the value of the number of the rotations or of the linear displacements cannot be stored in the volatile and/or the non-volatile storage.

In order to prevent this case, the processing electronic circuit may comprise the function of the following error detection, which may be performed continuously during the operation.

If the control electronics SE detects the voltage impulse of the Wiegand module, it may determine the direction information and the magnetic pole information by determining whether the north pole or the south pole of the permanent magnet arrangement is located at the first or at the second position. This obtained information may be stored by the control electronics SE in the form of, for example, two bits at corresponding predetermined reserved storage cells in the volatile and/or in the non-volatile data storage. For example, in this connection, one of the bits may indicate the direction information, i.e. whether the permanent magnet arrangement moves in said one direction or in said opposite direction, and the other bit may indicate the magnetic pole information, i.e. how the north pole or the south pole of the permanent magnet arrangement is oriented, i.e. whether the north pole or the south pole of the permanent magnet arrangement is located at the first or at the second position.

Upon detecting the subsequent voltage impulse from the Wiegand module, the control electronics SE may determine, likewise, the direction information and the magnetic pole information, which again may be available, for example, in the form of two bits. The control electronics SE of the processing electronic circuit may incorporate these two lastly obtained (most current) bits and/or the lastly obtained (most current) direction information and magnetic pole information into a sequence, by storing them, for example, in an internal storage.

The control electronics SE may compare these lastly obtained bits, which may be, for example stored in the internal storage of the control electronics, with the two bits, which may be stored in the volatile and/or in the non-volatile data storage, and which may correspond to the directly preceding determination of the direction information and the magnetic pole information.

In the case of a rudimentary voltage impulse, the control electronics may loose the most current direction information and magnetic pole information, because it can no longer store the corresponding two bits (and the value of the number of the revolutions or of the linear displacements) in the volatile and/or in the non-volatile storage, and because the internal storage may be overwritten at the next voltage impulse.

From a comparison of the most current two bits with those that correspond to the directly preceding determination of the direction information and the magnetic pole information, the control electronics can recognize such an error, whether an erroneous storage process due to a rudimentary voltage impulse has been effected, or not, after the penultimate voltage impulse of the Wiegand module, because the two most recent bits may be identical to those, which may correspond to the directly preceding determination of the direction information and the magnetic pole information, i.e. consecutive direction information and magnetic pole information may be identical.

For a reliable error detection, it may be necessary that the counting sensor according to the invention may be capable to distinguish between the two different explained situations, in which a rudimentary voltage impulse may be effected.

The essential difference of the two explained cases, in which a rudimentary voltage impulse may be effected, may be that in the second case, the permanent magnet arrangement 1200 may move beyond the posture, in which the north-south-axis and/or the longitudinal axis of the permanent magnet 1201 may be oriented parallel to the longitudinal axis LAW of the Wiegand wire 1101, without change of its movement direction, whereas in the first case a change of the movement direction may be effected without the permanent magnet arrangement 1200, after the generation of the voltage impulse, reaching the posture, in which the north-south-axis and/or the longitudinal axis of the permanent magnet 1201 may be oriented parallel to the longitudinal axis LAW of the Wiegand wire 1101.

In this respect, an arbitrary position on the diagonal D1, which may be opposite to the one or the other end of the Wiegand wire 1101, can be considered to be a tracking position. For example, in FIG. 5, a position, at which a magnetic-field-sensitive storage 1301 may be arranged, can be considered as the tracking position.

For a distinction, which one of the cases, which may have resulted in a rudimentary voltage impulse, may have occurred between two consecutive identical direction and magnetic pole informations, it may be necessary to determine whether the magnetic pole, which may be contained in the identical magnetic pole informations, has, or has not, come to pass the tracking position in time between the voltage impulses, which may have resulted to the storing of the identical direction and magnetic pole informations, and to possibly store this information in a tracking storage.

Three variants may be available for this determination, which are explained in the following.

I. Magnetic-Field-Sensitive Storage as Tracking Storage

On the one hand, it may be possible to arrange a magnetic-field-sensitive storage on the diagonal D1, such that the north pole and the south pole of the permanent magnet arrangement 1201 can come to pass it alternatingly upon rotation of the permanent magnet arrangement. For example, the magnetic-field-sensitive storage 1301 may be arranged on the diagonal D1. The magnetic-field-sensitive storage 1301 may serve as the mentioned tracking storage.

The tracking storage 1301 may be configured in particular such that it may be erased upon the generation of the (non-rudimentary) voltage impulse, and may be subsequently written into exclusively (once) by the magnetic pole of the permanent magnet arrangement 1200, which may be the first in time which may passes it, with the tracking information. That is, after the erasure, the tracking storage 1301 may be written into only once. After this writing into, the tracking information cannot be changed any more by one of the magnetic poles until a re-erasure may be performed.

Prior to the erasure, the tracking information contained in the tracking storage may be read out.

The tracking information may indicate, whether, after the generation of the (non-rudimentary) voltage impulse and the erasure of the tracking storage, the north pole or the south pole of the permanent magnet 1201 may have first come to pass and/or sweep over the tracking storage.

For the cases discussed above, in which a rudimentary voltage impulse may occur, for example, the following information combinations may occur:

If
(i) the north pole is contained in the consecutive identical magnetic pole informations,
(ii) the consecutive identical direction informations have been derived from the first position (Hall element B), and
(iii) the tracking information stored in the tracking storage indicates that the south pole has passed the tracking position and has written into the tracking storage,
this may mean that the rudimentary voltage impulse may have occurred due to the first movement sequence mentioned above (runt due to direction), and the north pole may not have passed the tracking position in the direction, which may be contained in the identical direction information, in time between the identical direction informations and magnetic pole informations.

If
(i) the north pole is contained in the consecutive identical magnetic pole informations,
(ii) the consecutive identical direction informations have been derived from the first position (Hall element B), and
(iii) the tracking information stored in the tracking storage indicates that the north pole has passed the tracking position and has written into the tracking storage,
this may mean that the rudimentary voltage impulse may have occurred due to the second movement sequence explained above (runt due to quality), and the north pole may have passed the tracking position in the direction, which may be contained in the identical direction information, in time between the identical direction informations and magnetic pole informations.

If
(i) the south pole is contained in the consecutive identical magnetic pole informations,
(ii) the consecutive identical direction informations have been derived from the first position (Hall element B), and
(iii) the tracking information stored in the tracking storage indicates that the north pole has passed the tracking position and has written into the tracking storage, this may mean that the rudimentary voltage impulse may have occurred due to the first movement sequence explained above (runt due to direction), and the south pole may not have passed the tracking position in the direction, which may be contained in the identical direction information, in time between the identical direction informations and magnetic pole informations.

If
(i) the south pole is contained in the consecutive identical magnetic pole informations,
(ii) the consecutive identical direction informations have been derived from the first position (Hall element B), and
(iii) the tracking information stored in the tracking storage indicates that the south pole has passed the tracking position and has written into the tracking storage,
this may mean that the rudimentary voltage impulse may have occurred due to the second movement sequence explained above (runt due to quality), and the south pole may have passed the tracking position in the direction, which may be contained in the identical direction informations, in time between the identical direction informations and magnetic pole informations.

If the direction information indicates the opposite direction, the equivalent conclusions result, as is listed in the following:

If
(i) the north pole is contained in the consecutive identical magnetic pole informations,
(ii) the consecutive identical direction informations have been derived from the second position (Hall element C), and
(iii) the tracking information stored in the tracking storage indicates that the south pole has passed the tracking information and has written into the tracking storage,
this may mean that the rudimentary voltage impulse may have occurred due to the first movement sequence explained above (runt due to direction), and the north pole may not have passed the tracking position in the direction, which may be contained in the identical direction information, in time between the identical direction informations and magnetic pole informations.

If
(i) the north pole is contained in the consecutive identical magnetic pole informations, (ii) the consecutive identical direction informations have been derived from the second position (Hall element C), and (iii) the tracking information stored in the tracking storage indicates that the north pole has passed the tracking position and has written the tracking storage, this may mean that the rudimentary voltage impulse may have occurred due to the second movement sequence explained above (runt due to quality), and the north pole may have passed the tracking position in the direction, which may be contained in the identical direction informations, in time between the identical direction informations and magnetic pole informations.

If (i) the south pole is contained in the consecutive identical magnetic pole informations, (ii) the consecutive identical direction informations have been derived from the second position (Hall element C), and (iii) the tracking information stored in the tracking storage indicates that the north pole has passed the tracking position and has written the tracking storage, this may mean that the rudimentary voltage impulse may have occurred due to the first movement sequence explained above (runt due to direction), and the south pole may not have passed the tracking position in the direction, which may be contained in the identical direction informations, in time between the identical direction informations and magnetic pole informations.

If (i) the south pole is contained in the consecutive identical magnetic pole informations, (ii) the consecutive identical direction informations have been derived from the second position (Hall element C), and (iii) the tracking information stored in the tracking storage indicates that the south pole has passed the tracking position and has written the tracking storage, this may mean that the rudimentary voltage impulse may have occurred due to the second movement sequence explained above (runt due to quality), and the south pole may have passed the tracking position in the direction, which may be contained in the identical direction informations, in time between the identical direction informations and magnetic pole informations.

Alternatively to the arrangement of the magnetic-field-sensitive storage 1301, the latter could also be arranged at the position, which is referred to by the reference numeral 1301', wherein in this case, the tracking information would, for the explained cases, indicate the respective opposite polarity of the permanent magnet.

II. Magnetic-Field-Sensitive Temporary Storage

A further variant for the determination as to whether the magnetic pole, which may be contained in the identical magnetic pole informations, may have passed the tracking position in time between the receipt of the identical direction and magnetic pole informations or not, may be the use of a magnetic-field-sensitive temporary storage 1302, which can be arranged between the Hall elements A and B, as is shown in FIG. 5.

This magnetic-field-sensitive temporary storage could also be arranged at the position, which is referred to by the reference numeral 1302'.

Generally, the magnetic-field-sensitive temporary storage 1302 may concern such a storage, which can be written only upon the occurrence of a voltage impulse by one of the magnetic poles of the permanent magnet arrangement 1200. For example, the magnetic-field-sensitive temporary storage 1302 may concern a TAS-MRAM (Thermally Assisted Switching-Magnetoresistive Random-Access Memory), which may be slightly heated by the energy, which may be obtained upon the occurrence of a voltage impulse, and which thereby may become writable in the heated-up state by one of the magnetic poles of the permanent magnet 1201.

If the coil of the Wiegand module 1100 outputs the voltage impulse, one of the magnetic poles may stand either at the first position (Hall element B) or at the second position (Hall element C), depending on the movement direction of the permanent magnet 1201, and thus the respective opposite magnetic pole may be at the opposite position, which may correspond to the Hall element D and/or A. The magnetic-field-sensitive temporary storage 1302, upon occurrence of the voltage impulse, may be written into by the magnetic pole, which may be located either at the first position (Hall element B) or at the position, which may correspond to the Hall element A, depending on the movement direction of the permanent magnet 1201.

After writing into the magnetic-field-sensitive temporary storage 1302, the latter may contain those magnetic pole data, which may indicate whether the magnetic-field-sensitive temporary storage 1302 may have been written by the north pole or by the south pole of the permanent magnet 1201.

The cooperation between the magnetic-field-sensitive temporary storage 1302 and the processing electronic circuit is explained with reference to the FIGS. 6A and 6B.

Figure 6A:
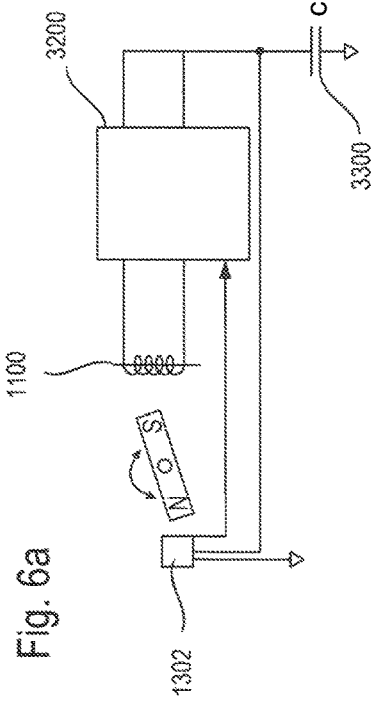
FIGS. 6a and 6b show schematically, how the magnetic-field-sensitive temporary storage is read out and is written into, in order to obtain tracking information and to transfer it to a tracking storage.

FIG. 6A shows schematically the connection of the magnetic-field-sensitive temporary storage 1302 to the processing electronic circuit, which may be arranged on the measurement unit 3200. If the Wiegand module 1100 outputs the voltage impulse, the latter may be rectified by the control electronics SE, as has been explained in the preceding, and may be output for charging the capacitor having the smaller capacity, which may be a part of the energy storage 3300. Of the energy, which may be supplied to the capacitor, a portion may be used for heating up the magnetic-field-sensitive temporary storage 1302. In the heated-up state, the magnetic-field-sensitive temporary storage may be written into by the north pole N of the permanent magnet 1201, as can be seen in FIG. 6A.

The method, as to how the tracking information can be gained from the magnetic pole data stored in the magnetic-field-sensitive temporary storage 1302, is explained in the following with reference to FIG. 6B. FIG. 6B shows the voltage curve (voltage as a function of time) of two voltage impulses, which are generated by the Wiegand module 1100.

If the voltage impulse exceeds a lower threshold value T1, the control electronics SE of the processing electronic circuit may read out the magnetic pole data from the magnetic-field-sensitive temporary storage 1302, and may transfer these [data] into a tracking storage, which may be, in this variant, for example a separate storage cell in the volatile data storage FD and/or in the non-volatile data storage NFD.

Subsequently, if the voltage impulse exceeds a medium voltage threshold T2, the magnetic-field-sensitive temporary storage 1302 may be heated up so far that the storage process may be approved (or unblocked), wherein the magnetic-field-sensitive temporary storage 1302 may be re-written into with the magnetic pole data by the magnetic pole, which may be next in space, of the permanent magnet 1201.

Finally, if the voltage impulse exceeds an upper voltage threshold T3, it may supply sufficient energy in order to possibly supply the processing electronic circuitry to an extent, so that all the elements may operate reliably. In other words, a voltage impulse, which may exceed the upper voltage threshold T3, may concern a non-rudimentary voltage impulse. In this case, (i) the processing electronic circuit may incorporate the current magnetic pole information and the direction information into the sequence in the form of the two bits by storing the two bits in the internal storage, (ii) may determine the number of rotations on the basis of the most current direction information and magnetic pole information, (iii) may store the corresponding value in the volatile storage FD and/or in the non-volatile NFD, (iv) may perform the particular error detection, which is to be explained in the following, and (v) may overwrite the stored, penultimate in time, direction information and magnetic pole information with the most current ones.

If the voltage impulse does not exceed the upper voltage threshold T3, a rudimentary voltage impulse may be concerned, which may not supply sufficient energy in order to possibly determine and possibly store the number of rotations as well as to overwrite the penultimate direction information and magnetic pole information by the most current ones. Such a rudimentary voltage impulse is also shown in FIG. 6B, wherein this one can occur in the cases that have already been discussed.

This rudimentary voltage impulse though may supply sufficient energy (at least in the case of a runt due to quality), in order to possibly read out the magnetic-field-sensitive temporary storage 1302, to possibly transfer the corresponding magnetic pole data into the tracking storage, and to possibly re-write the magnetic-field-sensitive temporary storage.

In the following, it is explained how the processing electronic circuit determines from the tracking information, whether after the receipt of consecutive identical direction informations and magnetic pole informations, the magnetic pole contained in the magnetic pole information has passed the tracking position or not.

For the cases discussed, in which a rudimentary voltage impulse may be effected, for example, the following combinations of information may occur:

If
(i) the north pole is contained in the consecutive identical magnetic pole informations,
(ii) the consecutive identical direction informations have been derived from the first position (Hall element B), and
(iii) the tracking information stored in the tracking storage indicates that the north pole has written the magnetic-field-sensitive temporary storage 1302, this may mean that the rudimentary voltage impulse may have occurred due to the first movement sequence explained above (runt due to direction), and the north pole may not have passed the tracking position in the direction, which may be contained in the identical direction informations, in time between the identical direction informations and magnetic pole informations.

If
(i) the north pole is contained in the consecutive identical magnetic pole informations,
(ii) the consecutive identical direction informations have been derived from the first position (Hall element B), and
(iii) the tracking information stored in the tracking storage indicates that the south pole has written the magnetic-field-sensitive temporary storage 1302, this may mean that the rudimentary voltage impulse may have occurred due to the second movement sequence explained above (runt due to quality), and the north pole may have passed the tracking position in the direction, which may be contained in the identical direction informations, in time between the identical direction informations and magnetic pole informations.

If
(i) the south pole is contained in the consecutive identical magnetic pole informations,
(ii) the consecutive identical direction informations have been derived from the first position (Hall element B), and
(iii) the tracking information stored in the tracking storage indicates that the south pole has written the magnetic-field-sensitive temporary storage 1302, this may mean that the rudimentary voltage impulse may have occurred due to the first movement sequence explained above (runt due to direction), and the south pole may not have passed the tracking position in the direction, which may be contained in the identical direction informations, in time between the identical direction informations and magnetic pole informations.

If
(i) the south pole is contained in the consecutive identical magnetic pole informations,
(ii) the consecutive identical direction informations have been derived from the first position (Hall element B), and
(iii) the tracking information stored in the tracking storage indicates that the north pole has written the magnetic-field-sensitive temporary storage 1302, this may mean that the rudimentary voltage impulse may have occurred due to the second movement sequence explained above (runt due to quality), and the south pole may have passed the tracking position in the direction, which may be contained in the identical direction informations, in time between the identical direction informations and magnetic pole informations.

If the direction information indicates the opposite direction, equivalent conclusions may result, as is listed in the following:

If
(i) the north pole is contained in the consecutive identical magnetic pole informations,
(ii) the consecutive identical direction informations have been derived from the second position (Hall element C), and
(iii) the tracking information stored in the tracking storage indicates that the south pole has written the magnetic-field-sensitive temporary storage 1302, this may mean that the rudimentary voltage impulse may have occurred due to the first movement sequence explained above (runt due to direction), and the north pole may not have passed the tracking position in the direction, which may be contained in the identical direction informations, in time between the identical direction informations and magnetic pole informations.

If
(i) the north pole is contained in the consecutive identical magnetic pole informations,
(ii) the consecutive identical direction informations have been derived from the second position (Hall element C), and
(iii) the tracking information stored in the tracking storage indicates that the north pole has written the magnetic-field-sensitive temporary storage 1302, this may mean that the rudimentary voltage impulse may have occurred due to the second movement sequence explained above (runt due to quality), and the north pole may have passed the tracking position in the direction, which may be contained in the identical direction informations, in time between the identical direction informations and magnetic pole informations.

If
(i) the south pole is contained in the consecutive identical magnetic pole informations, (ii) the consecutive identical direction informations have been derived from the second position (Hall element C), and (iii) the tracking information stored in the tracking storage indicates that the north pole has written the magnetic-field-sensitive temporary storage 1302, this may mean that the rudimentary voltage impulse may have occurred due to the first movement sequence explained above (runt due to direction), and the south pole may not have passed the tracking position in the direction, which may be contained in the identical direction informations, in time between the identical direction informations and magnetic pole informations.

If (i) the south pole is contained in the consecutive identical magnetic pole informations, (ii) the consecutive identical direction informations have been derived from the second position (Hall element C), and (iii) the tracking information stored in the tracking storage indicates that the south pole has written the magnetic-field-sensitive temporary storage 1302, this may mean that the rudimentary voltage impulse may have occurred due to the second movement sequence explained above (runt due to quality), and the south pole may have passed the tracking position in the direction, which may be contained in the identical direction informations, in time between the identical direction informations and magnetic pole informations.

III. Special Implementation of the Processing Electronic Circuit

A further variant for the determination as to whether, or not, the magnetic pole contained in the identical magnetic pole information has passed the tracking position in time between the receipt of the identical direction and magnetic pole informations, may be represented by a special implementation of the processing electronic circuit.

The processing electronic circuit may also be configured to monitor the voltage thresholds, which have been explained with reference to the second variant. Generally stated, the voltage thresholds may be monitored by monitoring the voltage of the capacitor having the smaller capacity.

Figure 6B:
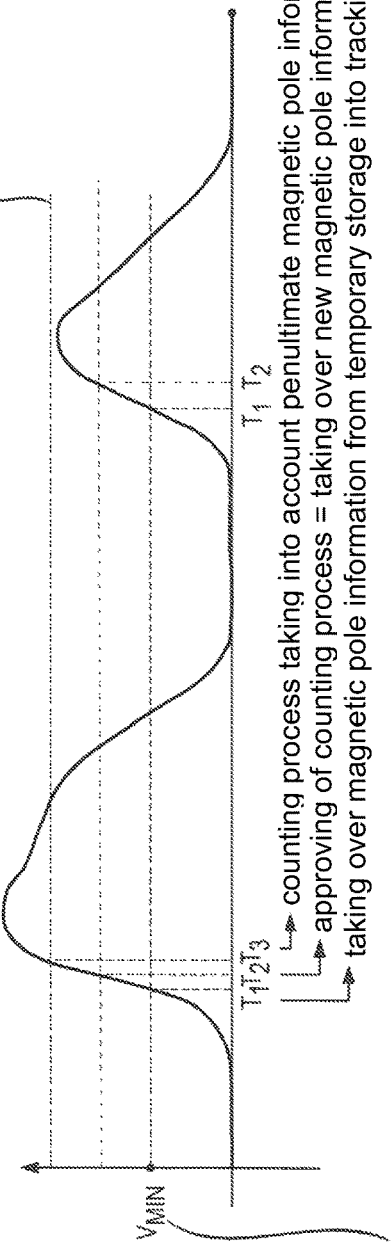

In this respect, FIG. 6B holds also for the present variant. The tracking storage may be, in this variant, identical to that of the second variant.

Furthermore, the processing electronic circuit may be implemented such that it may determine firstly the magnetic pole information from the signals of the Hall elements, if the voltage impulse of the Wiegand module 1100 reaches and/or exceeds the medium threshold T2, and may store the magnetic pole information such that it may not be lost even if the voltage impulse should not exceed the upper voltage threshold T3. For example, a temporary storage in the form of a preferred single storage cell of the volatile memory FD and/or of the non-volatile memory NFD may serve for such a storing (or storage process). Alternatively, the storage cell of the internal storage may be implemented and/or may be operated accordingly. The direction information may not yet be determined at this point in time.

If the voltage impulse of the Wiegand module 1100 exceeds the lower threshold T1, the magnetic pole information may be read out from the temporary storage, and may be transferred to the tracking storage.

If the voltage impulse of the Wiegand module 1100 subsequently exceeds the second voltage threshold T2, as has been mentioned already, exclusively (or only) the magnetic pole data from the output signals of the Hall elements may be determined, and may be stored in the explained temporary storage. As also in the magnetic-field-sensitive temporary storage of the second variant, the most current magnetic pole data may thus be located in the temporary storage, and the penultimate magnetic pole data may be in the tracking storage.

Finally, if the voltage impulse exceeds an upper voltage threshold T3, it may supply sufficient energy in order to supply the processing electronic circuit to the extent, so that all elements may operate reliably. In other words, a voltage impulse, which may exceed the upper voltage threshold T3, may concern a non-rudimentary voltage impulse.

In this case, the processing electronic circuit (i) may incorporate the current magnetic pole information and the direction information into the sequence in the form of the two bits by storing the two bits in the internal storage, (ii) may determine the number of the rotations on the basis of the most recent direction information and the magnetic pole information, (iii) may store the corresponding value in the volatile memory FD and/or in the non-volatile memory NFD, (iv) may perform the particular error detection to be explained in the following, and (v) may overwrite the stored, penultimate in time, direction information and magnetic pole information with the most current ones.

If the voltage impulse does not exceed the upper voltage threshold T3, a rudimentary voltage impulse may be concerned, which may not supply sufficient energy in order to perform the steps (i)-(v) mentioned herein before. Such a rudimentary voltage impulse is also shown in FIG. 6B, wherein this one may occur in the cases that have been discussed already.

This rudimentary voltage impulse though may supply sufficient energy (in the case of a runt due to quality), in order to possibly read out the temporary storage, to possibly transfer the corresponding magnetic pole data into the tracking storage, and to possibly re-write the temporary storage. In the case of a runt due to direction, the energy of the voltage impulse may, however, be so small that even the lower voltage threshold T1 may not be reached. Though, this may not be important, because just in these cases, the information, which may have been stored with the energy of the previously effected voltage impulse, would not change at all. Thus, in the evaluation of the next, non-rudimentary voltage impulse, no errors may result in the evaluation.

The method (or manner) as to how the processing electronic circuit may determine from the tracking information, whether, or not, after the receipt of consecutive identical direction informations and magnetic pole informations, the magnetic pole, which may be contained in the magnetic pole information, may have passed the tracking position, may be identical with the one of the second variant.

The variants for the determination and storage of the tracking information, which have been set forth in the preceding, have been discussed with reference to FIG. 5, which explains the counting sensor according to the invention that is configured to determine rotations of an object. The information may not be limited to this counting sensor, but may also be applicable to the counting sensor shown in FIG. 3.

Also in this counting sensor, the two different types of rudimentary voltage impulses may occur, which is to be explained in the following.

a. First possible case of a rudimentary voltage impulse (runt due to direction)

In an initial position (or posture) of the permanent magnet arrangement 2200, in which the north-south-axis of the permanent magnet 2202 may be in the plane, in which also the diagonal D2 and the longitudinal axis LAW of the Wiegand wire 1101 may be arranged, the magnetic domains and/or Weiß domains of the Wiegand wire 1101 may be oriented completely according to the magnetic field of the permanent magnet 2202. The magnetic field may act maximally on the magnetic domains and/or Weiß domains of the Wiegand wire.

If, starting from this initial position, the permanent magnet 2202 moves in a positive movement direction BR, the coil of the Wiegand module 1100 may generate the voltage impulse, if the south pole of the permanent magnet 2202 reaches the first position (Hall element B).

If the permanent magnet arrangement 2200 then immediately changes its movement direction and moves in a negative movement direction BR, wherein the south pole may not move beyond the first position but changes its movement direction, the Wiegand wire 1101 may have only a partial, or even no, defined magnetization state. The Wiegand wire 1101 would assert a completely defined and desired magnetization state namely only then, if the permanent magnet 2201 would have moved in the positive movement direction BR until the north-south-axis of the permanent magnet 2201 may be in the plane, in which the diagonal D2 and the longitudinal axis LAW of the Wiegand wire 1101 may also be located.

If the permanent magnet 2202 returns to its initial position in the negative movement direction, and if the north pole of the permanent magnet 2202 thereby reaches the second position (Hall element C), the case may occur, that the coil of the Wiegand module 1100 may output a rudimentary voltage impulse or even no voltage impulse.

If, after reaching the initial position, the movement direction of the permanent magnet 2202 changes again, and if the south pole of the permanent magnet 2202 reaches the first position again, then, in this position, a (non-rudimentary) voltage impulse may be effected again.

b. Second possible case of a rudimentary voltage impulse (runt due to quality)

If the permanent magnet arrangement 2200 moves from the mentioned initial position, in which the north-south-axis of the permanent magnet 2202 may be in the plane, in which also the diagonal D2 and the longitudinal axis LAW of the Wiegand wire 1101 may be located, in a positive movement direction, the generation of a voltage impulse may be effected, if the south pole of the permanent magnet 2201 reaches the first position.

If the movement direction, in which the permanent magnet arrangement 2200 moves, then does not change, such that the north pole of the next permanent magnet, which may follow the permanent magnet 2201 (not shown in FIGS. 3 and 7), reaches the first position, the next (non-rudimentary) voltage impulse should be effected.

However, a non-rudimentary voltage impulse may not compulsorily be the case.

In the framework of the development activities of the inventors, it has been recognized, that a rudimentary voltage impulse may be effected also in the sketched second movement sequence, in which no change of direction of the movement direction of the permanent magnet arrangement 2200 is performed, namely due to quality variations of the Wiegand wire 1101.

The next (non-rudimentary) voltage impulse may occur then, if, for constant movement direction, the south pole of the further next permanent magnet (not shown) reaches the first position.

A distinction of the two different types of rudimentary voltage impulses may also be performed on the basis of the three variants, which have already been explained.

Figure 7:
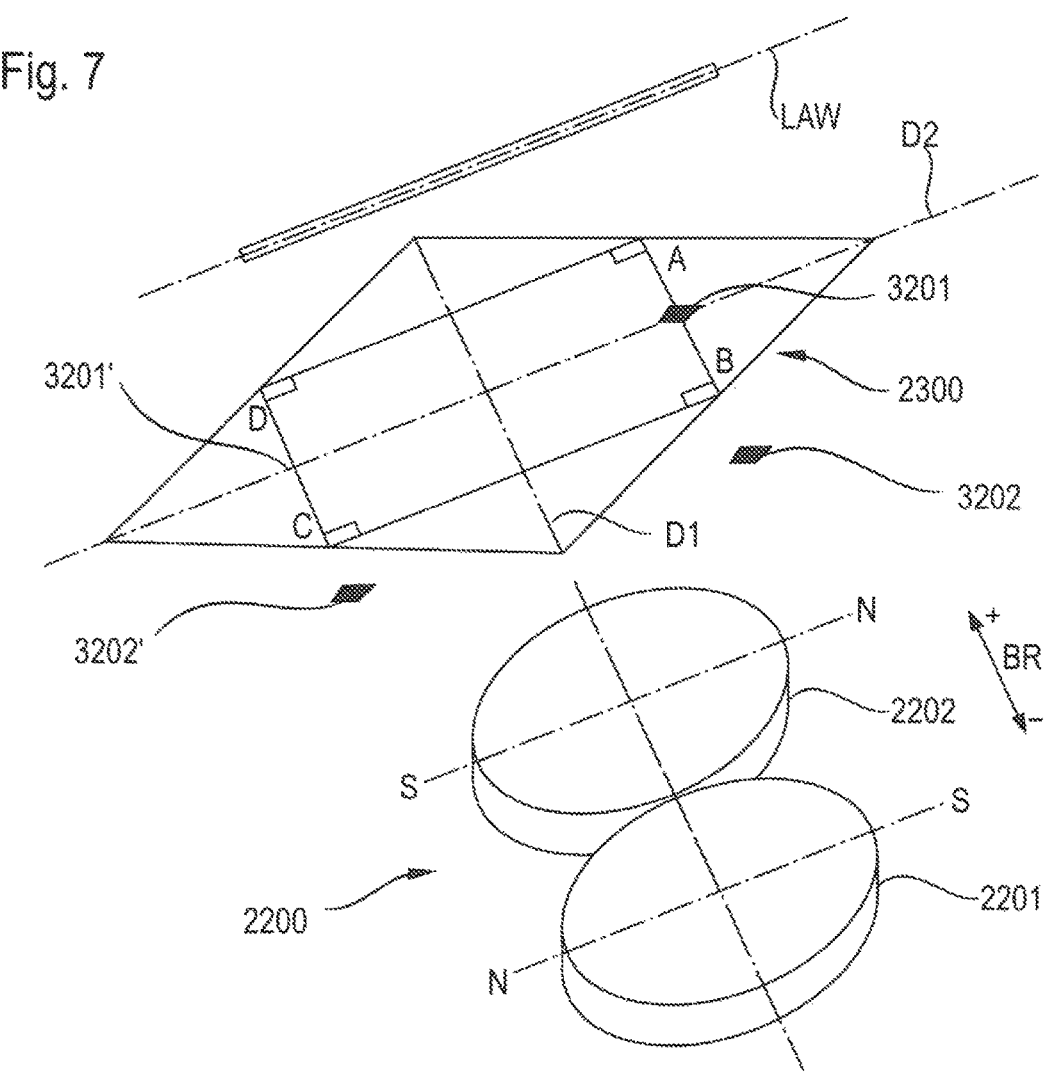
FIG. 7 shows the counting sensor according to the invention of FIG. 3, wherein the possible positions of a magnetic-field-sensitive storage and of a magnetic-field-sensitive temporary storage are indicated.

FIG. 7 shows the counting sensor of FIG. 3, wherein the magnetic-field-sensitive storage of the first variant above, which may also serve as the tracking storage at the same time, may be located on the diagonal D2 at the tracking position, and is referred to by the reference numeral 3201.

This magnetic-field-sensitive storage 3201 could also be arranged at the location (alternative tracking position), which is referred to by the reference numeral 3201'.

Further, according to the second variant, which has already been explained above, the magnetic-field-sensitive temporary storage could be provided, which is referred to by the reference numeral 3202. The magnetic-field-sensitive temporary storage 3202 may be located in the measurement plane, which may be spanned by the measurement substrate, wherein the magnetic-field-sensitive temporary storage 3202 may be supported by a support (or mounting) which is not shown. Alternatively, the measurement substrate 3200 could also extend to its [temporary storage] position.

The magnetic-field-sensitive temporary storage 3202, upon occurrence of the voltage impulse, may be written by the spatially next magnetic pole, whereby the magnetic pole data, which may have been stored previously, may be transferred into the tracking storage.

Finally, also in the counting sensor 2000 shown in FIG. 7, the processing electronic circuit may be embodied as in the counting sensor shown in FIG. 5, and such that the tracking information may be obtained from the signals of the Hall elements.

(Particular Error Detection)

If the processing electronic circuit has obtained the current magnetic pole information and direction information, it may perform the following particular error detection taking into consideration the tracking information.

In this relation, the control electronics SE may recognize the following:

1. If the sequence of the bits yields that consecutive direction informations and magnetic pole informations are different, the error detection may provide a result to the effect that an error may be present. In this case, the tracking information may not be relevant.

The mentioned sequence may mean namely, that the direction, in which the permanent magnet arrangement may move, may have changed and a rotation or linear displacement of the permanent magnet arrangement may not have been recognized completely. For example, if the two bits in the volatile and/or in the non-volatile data storage indicate that the permanent magnet arrangement moves in said one direction and the north pole is located at the first position, and the bits, which have lastly (currently) been determined by the control electronics, indicate that the permanent magnet arrangement moves in said opposite direction and the south pole is located at the second position, this may mean that preceding direction information and magnetic pole information, which may indicate that the permanent magnet arrangement moves in the opposite direction and the north pole is located at the second position, have not been recognized, and the corresponding bits have not been stored.

According to this recognized error, a correction may be performed to the effect that the value in the volatile and/or in the non-volatile data storage may be supplemented. The supplementation may depend on the resolution of the counting sensor, which in turn may depend on the number of the permanent magnets and/or the number of the magnetic poles of the permanent magnet arrangement. The bits in the reserved storage areas may be overwritten by the current ones.

2. If the sequence of the bits yields that consecutive direction informations and magnetic pole informations are identical, the error detection of the control electronics SE may provide a result to the effect that an error may be present. In this case, the tracking information may be relevant.

The mentioned sequence may mean namely that the direction, in which the permanent magnet arrangement may move, either may have changed twice and a rudimentary voltage impulse (runt according to direction) may have occurred, or may not have changed and a rudimentary voltage impulse (runt to quality) may have occurred.

According to this recognized error, a correction may be determined to the effect that either (i) the value in the volatile and/or in the non-volatile data storage may not be changed, if the tracking information indicates that the rudimentary voltage impulse has occurred due to the first movement sequence explained above (runt to direction), or (ii) the value in the volatile and/or the non-volatile data storage may be changed, if the tracking information indicates that the rudimentary voltage impulse has occurred due to the second movement sequence explained above (runt due to quality). The bits in the reserved storage areas may be overwritten by the current ones.

3. If the sequence of the bits yields that the consecutive direction informations are different and consecutive magnetic pole informations are identical, the error detection may provide a result to the effect that no error may be present.

The number of the rotations or of the linear displacements may be determined correspondingly and the corresponding value may be stored in the data storage, and the bits, which may be stored in the reserved storage areas, and which may indicate the direction information and the magnetic pole information, may be overwritten by the lastly determined bits for the next comparison.

4. If the sequence of the bits yields that consecutive direction informations are identical and consecutive magnetic pole informations are different, the error detection may provide a result to the effect that no error may be present.

The number of rotations or of linear displacements may again be determined correspondingly, and the corresponding value may be stored in the volatile and/or in the non-volatile data storage, and the bits, which may be stored in the reserved storage areas, and which may indicate the direction information and the magnetic pole information, may be overwritten by the lastly determined bits for the next comparison.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. Counting sensor for counting the number of rotations or linear displacements of an object, wherein the counting sensor has the following:
   one single Wiegand module, which is composed of a Wiegand wire having a coil surrounding the Wiegand wire;
   at least one sensor element;
   a processing electronic circuit, which is connected to the sensor element, and which is configured to evaluate an output signal that is output from the sensor element; and
   a permanent magnet arrangement, which is movable relatively to the Wiegand module in one direction as well as in a direction that is opposite to said one direction, wherein the permanent magnet arrangement is configured to be arranged at the object such that the permanent magnet arrangement effects the rotations or linear displacements together with the object; wherein:
   upon movement of the permanent magnet arrangement in said one direction, the coil of the Wiegand module generates a voltage impulse, if a north pole or a south pole of the permanent magnet arrangement is located at a first position, and, upon movement of the permanent magnet arrangement in said opposite direction, the coil of the Wiegand module generates a voltage impulse, if the north pole or the south pole of the permanent magnet arrangement is located at a second position that is different from the first position,
   in an autonomous mode, in which the counting sensor is not supplied with outside energy, the processing electronic circuit is supplied with energy, which is provided by the Wiegand module,
   the processing electronic circuit is configured, after detecting the voltage impulse output from the Wiegand module
   (i) to obtain direction information about whether the permanent magnet arrangement moves in said one direction or in said opposite direction by the evaluation of the output signal of the sensor element, and
   (ii) to obtain magnetic pole information about whether the north pole or the south pole of the permanent magnet arrangement is located at the first or the second position by the evaluation of the output signal of the sensor element or by the determination of the polarity of the voltage impulse generated by the coil of the Wiegand module;
   a data storage for storing a value, which indicates the number of the rotations or of the linear displacements; and
   a tracking information storage for storing tracking information, which indicates whether the south pole or the north pole of the permanent magnet arrangement has come to pass a particular tracking position or not, wherein the north pole or the south pole is located at the tracking position, if a magnetic field, which corresponds to the north pole or to the south pole, is oriented parallel to the Wiegand wire and acts maximally on the magnetic domains of the Wiegand wire; wherein:
   the processing electronic circuit is configured
   (i) to incorporate both the direction informations and also the magnetic pole informations in a sequence, to determine the number of the rotations or of the linear displacements of the object on the basis of the direction informations and the magnetic pole informations, and to store the corresponding value [of said number] in the data storage, and
   (ii) to perform, on the basis of said sequence and the tracking information, an error detection to the effect whether one of the turns or one of the linear displacements of the object has not been recognized partially or completely, and
   (iii) to determine a corresponding correction of said number and to correct said value upon detection of an error.

2. Counting sensor according to claim 1, wherein if, in said sequence, consecutive direction informations and consecutive magnetic pole informations are identical, the error detection provides a result to the effect that an error is present, and the correction is determined as a function of the tracking information such that
a. if the tracking information indicates that the magnetic pole, which is contained in the magnetic pole informations, has come to pass the tracking position in time between the receipt of the identical direction and magnetic pole informations, the value in the data storage is supplemented, and
b. if the tracking information indicates that the magnetic pole, which is contained in the magnetic pole information, has not come to pass the tracking position in time between the receipt of the identical direction and magnetic pole informations, the value in the data storage is not changed.

3. Counting sensor according to claim 2, wherein the tracking storage is arranged at the tracking position and is a magnetic field-sensitive storage, which is writable by the north and the south pole, which is erased upon the generation of the voltage impulse and which is subsequently written into the tracking information exclusively by the first pole of the permanent magnet arrangement, which comes to pass the tracking storage.

4. Counting sensor according to claim 3, wherein the processing electronic circuit is configured, upon the generation of the voltage impulse, to read out the tracking information from the tracking storage before the tracking information is erased.

5. Counting sensor according to claim 1, wherein the processing electronic circuit is configured
to store the magnetic pole information, if the voltage impulse, which is generated by the Wiegand module, exceeds a medium voltage threshold, wherein the precedingly stored magnetic pole information is transferred beforehand to the tracking storage and serves as the tracking information, if the voltage impulse, which is generated by the Wiegand module, exceeds a lower voltage threshold, which is below the medium voltage threshold, and
to determine, on the basis of the direction information and the magnetic pole information, the number of rotations or of the linear displacements of the object, and to store the corresponding value in the data storage, if the voltage impulse, which is generated by the Wiegand module, exceeds an upper voltage threshold, which is above the medium voltage threshold.

6. Counting sensor according to claim 1, wherein
the counting sensor further has a magnetic field-sensitive temporary storage, which is written directly by the north pole or by the south pole of the permanent magnet arrangement, and which stores magnetic pole data, which indicate whether the temporary storage has been written into by the north pole or by the south pole; and
the processing electronic circuit is configured,
to read out the magnetic pole data from the temporary storage and to transfer [them] into the tracking storage, if the voltage impulse, which is generated by the Wiegand module, exceeds a lower voltage threshold, and subsequently to allow an overwriting of the data in the magnetic field-sensitive temporary storage, and
to determine, on the basis of the direction information and the magnetic pole information, the number of the rotations or of the linear displacements of the object, and to store the corresponding value in the data storage, if the voltage impulse, which is generated by the Wiegand module, exceeds an upper voltage threshold, which is above the lower voltage threshold.

7. Counting sensor according to claim 1, wherein
if, in said sequence, consecutive direction informations are identical and consecutive magnetic pole informations are different, the error detection provides a result to the effect that no error is present, and the number of the rotations or of the linear displacements of the object is determined correspondingly, and the corresponding value is stored in the data storage.

8. Counting sensor according to claim 1, wherein
if, in said sequence, consecutive direction informations and consecutive magnetic pole informations are different, the error detection provides a result to the effect that an error is present, and the correction is determined to the effect that the value in the data storage is supplemented.

9. Counting sensor according to claim 1, wherein
if, in said sequence, consecutive direction informations are different and consecutive magnetic pole informations are identical, the error detection provides a result to the effect that no error is present, and the number of the rotations or of the linear displacements of the object is determined correspondingly, and the corresponding value is stored in the data storage.

10. Counting sensor according to claim 1, wherein the sensor element is at least a first Hall element, and the first Hall element is arranged such that the processing electronic circuit obtains the direction information by the evaluation of the output signal of the first Hall element.

11. Counting sensor according to claim 10, wherein the counting sensor has a further sensor element in the form of a second Hall element, and wherein the first Hall element and the second Hall element are arranged such that the processing electronic circuit (i) redundantly obtains the direction information by the evaluation of the output signal of the first Hall element and the output signal of the second Hall element, and (ii) redundantly obtains the magnetic pole information by the determination of the polarity of the voltage impulse, which is generated by the coil of the Wiegand module, by the evaluation of the output signal of the first Hall element, and by the evaluation of the output signal of the second Hall element.

12. Counting sensor for counting the number of rotations or linear displacements of an object, wherein the counting sensor has the following:
one single Wiegand module, which is composed of a Wiegand wire having a coil surrounding the Wiegand wire;
at least one sensor element;
a processing electronic circuit, which is connected to the sensor element, and which is configured to evaluate an output signal that is output from the sensor element; and
a permanent magnet arrangement, which is movable relatively to the Wiegand module in one direction as well as in a direction that is opposite to said one direction, wherein the permanent magnet arrangement is configured to be arranged at the object such that the permanent magnet arrangement effects the rotations or linear displacements together with the object; wherein:
upon movement of the permanent magnet arrangement in said one direction, the coil of the Wiegand module generates a voltage impulse, if a north pole or a south pole of the permanent magnet arrangement is located at a first position, and, upon movement of the permanent magnet arrangement in said opposite direction, the coil of the Wiegand module generates a voltage impulse, if the north pole or the south pole of the permanent magnet arrangement is located at a second position that is different from the first position, in an autonomous mode, in which the counting sensor is not supplied with outside energy, the processing electronic circuit is supplied with energy, which is provided by the Wiegand module, the processing electronic circuit is configured, after detecting the voltage impulse output from the Wiegand module (i) to obtain direction information about whether the permanent magnet arrangement moves in said one direction or in said opposite direction by the evaluation of the output signal of the sensor element, and (ii) to obtain magnetic pole information about whether the north pole or the south pole of the permanent magnet arrangement is located at the first or the second position by the evaluation of the output signal of the sensor element or by the determination of the polarity of the voltage impulse generated by the coil of the Wiegand module;

a data storage for storing a value, which indicates the number of the rotations or of the linear displacements; and a tracking information storage for storing tracking information, which indicates whether the south pole or the north pole of the permanent magnet arrangement has come to pass a particular tracking position or not, wherein the north pole or the south pole is located at the tracking position, if a magnetic field, which corresponds to the north pole or to the south pole, is oriented parallel to the Wiegand wire and acts maximally on the magnetic domains of the Wiegand wire; wherein:

the processing electronic circuit is configured (i) to incorporate both the direction informations and also the magnetic pole informations in a sequence, to determine the number of the rotations or of the linear displacements of the object on the basis of the direction informations and the magnetic pole informations, and to store the corresponding value [of said number] in the data storage, and (ii) to perform, on the basis of said sequence and the tracking information, an error detection to the effect whether one of the turns or one of the linear displacements of the object has not been recognized partially or completely, and (iii) to determine a corresponding correction of said number and to correct said value upon detection of an error; and wherein:

if, in said sequence, consecutive direction informations and consecutive magnetic pole informations are identical, the error detection provides a result to the effect that an error is present, and the correction is determined as a function of the tracking information such that a. if the tracking information indicates that the magnetic pole, which is contained in the magnetic pole informations, has come to pass the tracking position in time between the receipt of the identical direction and magnetic pole informations, the value in the data storage is supplemented, and b. if the tracking information indicates that the magnetic pole, which is contained in the magnetic pole information, has not come to pass the tracking position in time between the receipt of the identical direction and magnetic pole informations, the value in the data storage is not changed.

13. Counting sensor according to claim 12, wherein the tracking storage is arranged at the tracking position and is a magnetic field-sensitive storage, which is writable by the north and the south pole, which is erased upon the generation of the voltage impulse and which is subsequently written into the tracking information exclusively by the first pole of the permanent magnet arrangement, which comes to pass the tracking storage.

14. Counting sensor according to claim 13, wherein the processing electronic circuit is configured, upon the generation of the voltage impulse, to read out the tracking information from the tracking storage before the tracking information is erased.

15. Counting sensor for counting the number of rotations or linear displacements of an object, wherein the counting sensor has the following:

one single Wiegand module, which is composed of a Wiegand wire having a coil surrounding the Wiegand wire;

at least one sensor element;

a processing electronic circuit, which is connected to the sensor element, and which is configured to evaluate an output signal that is output from the sensor element; and a permanent magnet arrangement, which is movable relatively to the Wiegand module in one direction as well as in a direction that is opposite to said one direction, wherein the permanent magnet arrangement is configured to be arranged at the object such that the permanent magnet arrangement effects the rotations or linear displacements together with the object; wherein:

upon movement of the permanent magnet arrangement in said one direction, the coil of the Wiegand module generates a voltage impulse, if a north pole or a south pole of the permanent magnet arrangement is located at a first position, and, upon movement of the permanent magnet arrangement in said opposite direction, the coil of the Wiegand module generates a voltage impulse, if the north pole or the south pole of the permanent magnet arrangement is located at a second position that is different from the first position, in an autonomous mode, in which the counting sensor is not supplied with outside energy, the processing electronic circuit is supplied with energy, which is provided by the Wiegand module, the processing electronic circuit is configured, after detecting the voltage impulse output from the Wiegand module (i) to obtain direction information about whether the permanent magnet arrangement moves in said one direction or in said opposite direction by the evaluation of the output signal of the sensor element, and (ii) to obtain magnetic pole information about whether the north pole or the south pole of the permanent magnet arrangement is located at the first or the second position by the evaluation of the output signal of the sensor element or by the determination of the polarity of the voltage impulse generated by the coil of the Wiegand module;

a data storage for storing a value, which indicates the number of the rotations or of the linear displacements; and a tracking information storage for storing tracking information, which indicates whether the south pole or the north pole of the permanent magnet arrangement has come to pass a particular tracking position or not, wherein the north pole or the south pole is located at the tracking position, if a magnetic field, which corresponds to the north pole or to the south pole, is oriented parallel to the Wiegand wire and acts maximally on the magnetic domains of the Wiegand wire; wherein:

the processing electronic circuit is configured (i) to incorporate both the direction informations and also the magnetic pole informations in a sequence, to determine the number of the rotations or of the linear displacements of the object on the basis of the direction informations and the magnetic pole informations, and to store the corresponding value [of said number] in the data storage, and (ii) to perform, on the basis of said sequence and the tracking information, an error detection to the effect whether one of the turns or one of the linear displacements of the object has not been recognized partially or completely, and (iii) to determine a corresponding correction of said number and to correct said value upon detection of an error; and wherein the processing electronic circuit is configured to store the magnetic pole information, if the voltage impulse, which is generated by the Wiegand module, exceeds a medium voltage threshold, wherein the precedingly stored magnetic pole information is transferred beforehand to the tracking storage and serves as the tracking information, if the voltage impulse, which is generated by the Wiegand module, exceeds a lower voltage threshold, which is below the medium voltage threshold, and to determine, on the basis of the direction information and the magnetic pole information, the number of rotations or of the linear displacements of the object, and to store the corresponding value in the data storage, if the voltage impulse, which is generated by the Wiegand module, exceeds an upper voltage threshold, which is above the medium voltage threshold.

* * * * *